(12) United States Patent
Limb et al.

(10) Patent No.: US 11,107,645 B2
(45) Date of Patent: Aug. 31, 2021

(54) FUNCTIONALITY CHANGE BASED ON STRESS-ENGINEERED COMPONENTS

(71) Applicant: Palo Alto Research Center Incorporated, Palo Alto, CA (US)

(72) Inventors: Scott J. Limb, Palo Alto, CA (US); Christopher Paulson, Livermore, CA (US); Erica Ronchetto, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 218 days.

(21) Appl. No.: 16/204,996

(22) Filed: Nov. 29, 2018

(65) Prior Publication Data

US 2020/0176200 A1 Jun. 4, 2020

(51) Int. Cl.
  *H01H 9/00* (2006.01)
  *G02B 5/20* (2006.01)
(52) U.S. Cl.
  CPC .................. *H01H 9/00* (2013.01); *G02B 5/20* (2013.01)
(58) Field of Classification Search
  None
  See application file for complete search history.

(56) References Cited

U.S. PATENT DOCUMENTS

| | | |
|---|---|---|
| 2,529,210 A | 11/1950 | Butler |
| 3,397,278 A | 8/1968 | Pomerantz |
| 3,601,114 A | 8/1971 | Cook |
| 3,666,967 A | 5/1972 | Keister et al. |
| 3,673,667 A | 7/1972 | Lowenstein et al. |
| 3,882,323 A | 5/1975 | Smolker |
| 4,102,664 A | 7/1978 | Dunbaugh, Jr. |
| 4,139,359 A | 2/1979 | Johnson et al. |
| 4,471,895 A | 9/1984 | Lisec, Jr. |
| 4,558,622 A | 12/1985 | Tausheck |
| 4,598,274 A | 7/1986 | Holmes |
| 4,673,453 A | 6/1987 | Georgi |
| 4,739,555 A | 4/1988 | Jurgens |
| 5,374,564 A | 12/1994 | Bruel |

(Continued)

FOREIGN PATENT DOCUMENTS

WO 0143228 6/2001

OTHER PUBLICATIONS

Limb et al., U.S. Appl. No. 15/726,944, filed Oct. 6, 2017.

(Continued)

*Primary Examiner* — Ramsey Zacharia
(74) *Attorney, Agent, or Firm* — Mueting Raasch Group

(57) ABSTRACT

A device includes at least one stress-engineered portion and at least one second portion. The stress-engineered portion includes at least one tensile stress layer having a residual tensile stress and at least one compressive stress layer having a residual compressive stress. The tensile stress layer and the compressive stress layer are mechanically coupled such that the at least one tensile stress layer and the at least one compressive stress layer are self-equilibrating. The stress-engineered portion is configured to fracture due to propagating cracks generated in response to energy applied to the stress-engineered portion. Fracture of the stress-engineered portion changes functionality of the device from a first function to a second function, different from the first function.

21 Claims, 29 Drawing Sheets

(56) References Cited

U.S. PATENT DOCUMENTS

| | | | |
|---|---|---|---|
| 5,584,219 A | 12/1996 | Dunn et al. | |
| 5,791,056 A | 8/1998 | Messina | |
| 6,418,628 B1 | 7/2002 | Steingass | |
| 7,002,517 B2 | 2/2006 | Noujeim | |
| 7,068,254 B2 | 6/2006 | Yamazaki et al. | |
| 7,153,758 B2 | 12/2006 | Hata et al. | |
| 7,554,085 B2 | 6/2009 | Lee | |
| 7,880,248 B1 | 2/2011 | Pham et al. | |
| 7,944,049 B2 | 5/2011 | Fujii | |
| 8,130,072 B2 | 3/2012 | De Bruyker et al. | |
| 8,740,030 B2 | 6/2014 | Purdy et al. | |
| 9,154,138 B2 | 10/2015 | Limb et al. | |
| 9,294,098 B2 | 3/2016 | Shah et al. | |
| 9,356,603 B2 | 5/2016 | Limb et al. | |
| 9,577,047 B2 | 2/2017 | Chua et al. | |
| 9,630,870 B2 | 4/2017 | Zhao et al. | |
| 9,780,044 B2 | 10/2017 | Limb et al. | |
| 10,012,250 B2 | 7/2018 | Limb et al. | |
| 10,026,579 B2 | 7/2018 | Whiting et al. | |
| 10,026,651 B1 | 7/2018 | Limb et al. | |
| 10,308,543 B2 | 6/2019 | Lee | |
| RE47,570 E * | 8/2019 | Limb | H01L 21/64 |
| 10,947,150 B2 * | 3/2021 | Limb | H01L 23/57 |
| 2003/0089755 A1 | 5/2003 | Peers-Smith et al. | |
| 2004/0031966 A1 | 2/2004 | Forrest | |
| 2004/0222500 A1 | 11/2004 | Aspar et al. | |
| 2005/0061032 A1 | 3/2005 | Yoshizawa | |
| 2005/0082331 A1 | 4/2005 | Yang | |
| 2005/0084679 A1 | 4/2005 | Sglavo et al. | |
| 2005/0176573 A1 | 8/2005 | Thoma et al. | |
| 2006/0138798 A1 | 6/2006 | Oehrlein | |
| 2006/0270190 A1 | 11/2006 | Nastasi et al. | |
| 2007/0113886 A1 | 5/2007 | Arao et al. | |
| 2008/0029195 A1 | 2/2008 | Lu | |
| 2008/0311686 A1 | 12/2008 | Morral et al. | |
| 2009/0086170 A1 | 4/2009 | El-Ghoroury et al. | |
| 2010/0035038 A1 | 2/2010 | Barefoot et al. | |
| 2010/0133641 A1 | 6/2010 | Kim | |
| 2010/0225380 A1 | 9/2010 | Hsu et al. | |
| 2011/0048756 A1 | 3/2011 | Shi et al. | |
| 2011/0089506 A1 | 4/2011 | Hoofman et al. | |
| 2011/0183116 A1 | 7/2011 | Hung et al. | |
| 2012/0052252 A1 | 3/2012 | Kohli et al. | |
| 2012/0135177 A1 | 5/2012 | Comejo et al. | |
| 2012/0135195 A1 | 5/2012 | Glaesemann et al. | |
| 2012/0196071 A1 | 8/2012 | Comejo et al. | |
| 2012/0288676 A1 | 11/2012 | Sondergard et al. | |
| 2013/0037308 A1 | 2/2013 | Wang et al. | |
| 2013/0082383 A1 | 4/2013 | Aoya | |
| 2013/0140649 A1 | 6/2013 | Rogers et al. | |
| 2013/0192305 A1 | 8/2013 | Black et al. | |
| 2013/0273717 A1 | 10/2013 | Hwang et al. | |
| 2014/0091374 A1 | 4/2014 | Assefa et al. | |
| 2014/0103957 A1 | 4/2014 | Fritz et al. | |
| 2014/0266946 A1 | 9/2014 | Billy et al. | |
| 2014/0300520 A1 | 10/2014 | Nguyen et al. | |
| 2014/0323968 A1 | 10/2014 | Rogers et al. | |
| 2015/0001733 A1 | 1/2015 | Karhade | |
| 2015/0044445 A1 | 2/2015 | Garner et al. | |
| 2015/0076677 A1 | 3/2015 | Ebefors | |
| 2015/0089977 A1 | 4/2015 | Li | |
| 2015/0102852 A1 | 4/2015 | Limb et al. | |
| 2015/0121964 A1 | 5/2015 | Zhao et al. | |
| 2015/0229028 A1 | 8/2015 | Billy et al. | |
| 2015/0232369 A1 | 8/2015 | Majanovic et al. | |
| 2015/0318618 A1 | 11/2015 | Chen et al. | |
| 2015/0348940 A1 | 12/2015 | Woychik | |
| 2015/0358021 A1 | 12/2015 | Limb et al. | |
| 2015/0372389 A1 | 12/2015 | Chen et al. | |
| 2016/0122225 A1 | 5/2016 | Wada et al. | |
| 2016/0137548 A1 | 5/2016 | Cabral, Jr. et al. | |
| 2017/0036942 A1 | 2/2017 | Abramov et al. | |
| 2017/0217818 A1 | 8/2017 | Dumenil et al. | |
| 2017/0292546 A1 | 10/2017 | Limb et al. | |
| 2018/0005963 A1 | 1/2018 | Limb et al. | |
| 2018/0033577 A1 | 2/2018 | Whiting et al. | |
| 2018/0033742 A1 | 2/2018 | Chua et al. | |
| 2018/0114761 A1 | 4/2018 | Chua et al. | |
| 2018/0306218 A1 | 10/2018 | Limb et al. | |
| 2018/0330907 A1 | 11/2018 | Whiting et al. | |
| 2019/0106069 A1 | 4/2019 | Wheeler et al. | |

OTHER PUBLICATIONS

Murphy et al., U.S. Appl. No. 15/981,328, filed May 16, 2018.
File History for U.S. Appl. No. 14/796,440, 183 pages.
File History for U.S. Appl. No. 15/220,221, 198 pages.
File History for U.S. Appl. No. 15/220,164 192 pages.
File History for U.S. Appl. No. 15/629,506, 121 pages.
File History for U.S. Appl. No. 15/726,944, 145 pages.
File History for U.S. Appl. No. 15/689,566, 167 pages.
File History for U.S. Appl. No. 15/092,313, 195 pages.
File History for U.S. Appl. No. 15/229,385.
File History for U.S. Appl. No. 16/433,603.
File History for U.S. Appl. No. 15/981,328.
File History for U.S. Appl. No. 16/273,397.
File History for U.S. Appl. No. 15/092,313.
File History for U.S. Appl. No. 15/220,221.
File History for U.S. Appl. No. 15/629,506.
File History for U.S. Appl. No. 15/726,944.
File History for U.S. Appl. No. 16/025,573.
File History for U.S. Appl. No. 16/033,783.
File History for U.S. Appl. No. 16/207,709.
File History for U.S. Appl. No. 16/257,304.
File History for U.S. Appl. No. 15/299,385.

* cited by examiner

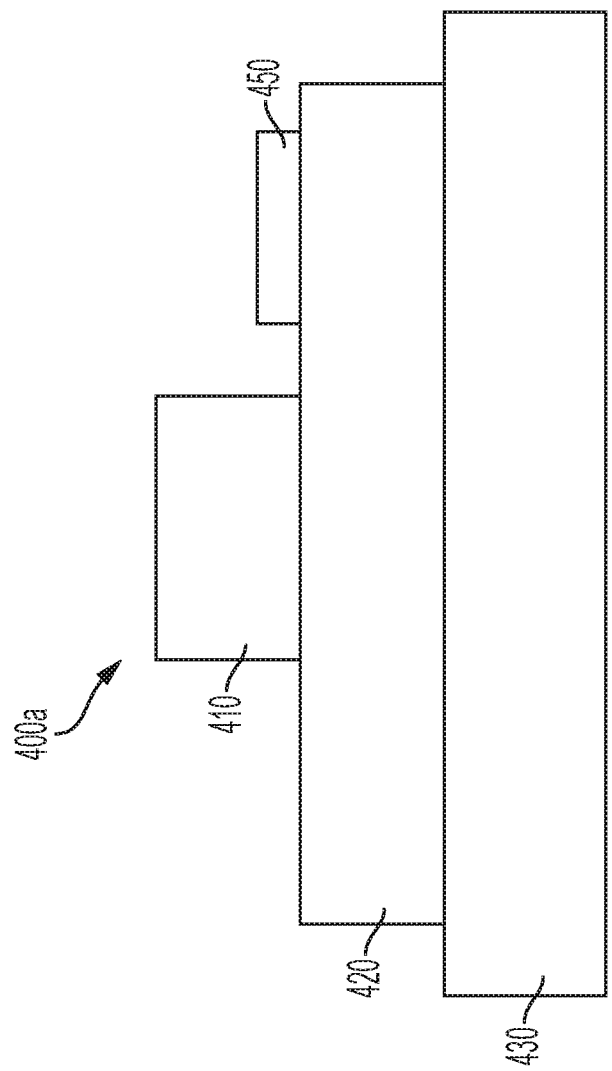

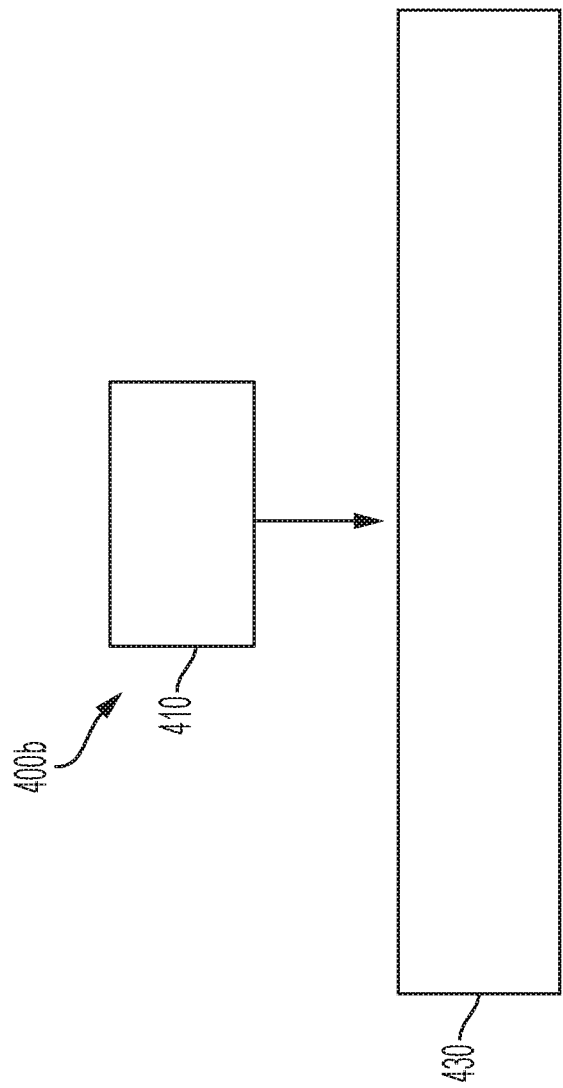

FUNCTIONALITY CHANGE BASED ON STRESS-ENGINEERED COMPONENTS

STATEMENT REGARDING FEDERALLY SPONSORED RESEARCH AND DEVELOPMENT

This invention is based upon work supported by DARPA under Contract No. HR0011-16-C-0087 DARPA-MTO-ICARUS-ONLYDUST. The Government has certain rights to this invention.

TECHNICAL FIELD

This disclosure relates generally to devices comprising stress-engineered layers configured to fracture in response to an applied energy and to related methods and systems.

BACKGROUND

Devices capable of fracturing in a controlled, triggerable manner are useful in a variety of applications.

BRIEF SUMMARY

Some embodiments are directed to a device that includes at least one stress-engineered portion and at least one second portion. The stress-engineered portion includes at least one tensile stress layer having a residual tensile stress and at least one compressive stress layer having a residual compressive stress. The tensile stress layer and the compressive stress layer are mechanically coupled such that the at least one tensile stress layer and the at least one compressive stress layer are self-equilibrating. The stress-engineered portion is configured to fracture due to propagating cracks generated in response to energy applied to the stress-engineered portion. Fracture of the stress-engineered portion changes functionality of the device from a first function to a second function, different from the first function.

Some embodiments involve a method of changing functionality of a device. The method includes fracturing a stress-engineered portion of the device. The stress-engineered portion comprises at least one tensile stress layer having a residual tensile stress and at least one compressive stress layer having a residual compressive stress. The tensile stress layer and the compressive stress layer are mechanically coupled such that the at least one tensile stress layer and the at least one compressive stress layer are self-equilibrating. The stress-engineered portion is configured to fracture in response due to propagating cracks generated in response to energy applied to the stress-engineered portion. Fracturing the stress-engineered portion causes a functionality of the device to change from a first function to a second function, different from the first function.

The above summary is not intended to describe each embodiment or every implementation. A more complete understanding will become apparent and appreciated by referring to the following detailed description and claims in conjunction with the accompanying drawings.

BRIEF DESCRIPTION OF DRAWINGS

FIGS. 4A through 4C illustrate a device wherein self-destruction of the stress-engineered portion causes second and third components to come into contact in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Stress-engineered layer technology can be used to selectively disintegrate portions of a device in which some portions of the device are designed for controlled fracture while other portions of the device remain intact. By fracturing some of the portions of the device, the functionality of the device can be changed. The most basic change can be activating or deactivating a device. Performance specifications can also be altered by selectively initiating fracture of some portions. Using this approach, the device's functionality can be changed to fit a different set of criteria or end result.

The process used in preparing the stress-engineered portion of the device, e.g., chemical tempering, imparts a large stress gradient within the thickness of the stress-engineered portion. This stored mechanical energy is abruptly released when an initial fracture is formed. For example, according to some implementations, the initial fracture is caused when a localized area is heated. The rapid heating and subsequent cooling damage the stress-engineered part leading to the initial fracture which in turn leads to propagating fractures.

The stress-engineered portion may have any suitable size and/or shape, e.g., a planar shape, a curved shape, a cylinder, etc. In some embodiments the stress-engineered portion may be hollow such as a tube or pipe.

Figure 1:
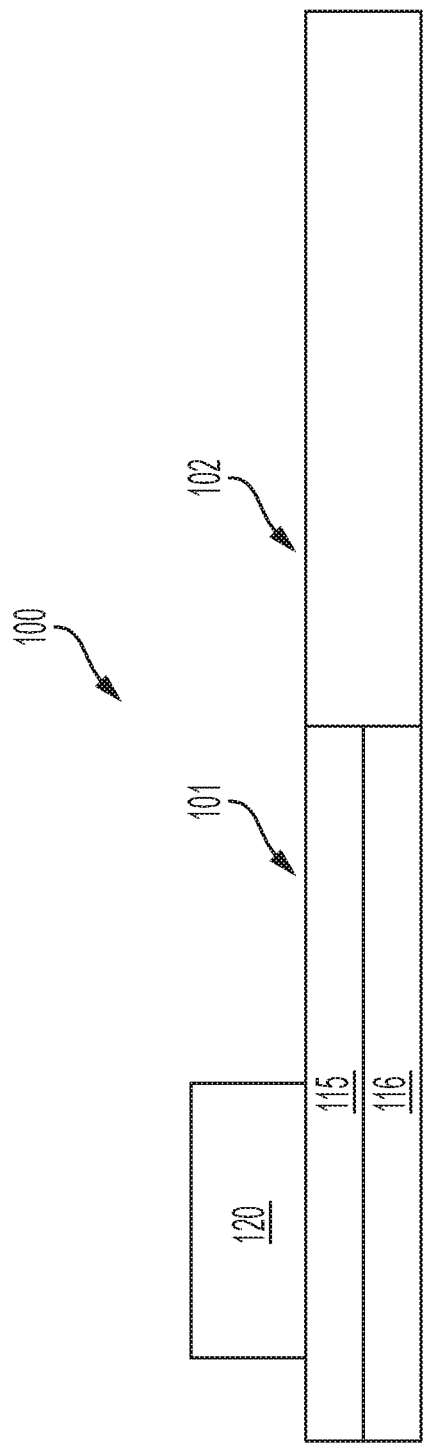
FIG. 1 illustrates a device having a first portion and a second portion, wherein the first portion is a stress-engineered portion that is designed to self-destruct by fracturing in response to an applied energy in accordance with some embodiments.

FIG. 1 illustrates a device 100 having a first portion 101 and a second portion 102, wherein the first portion 101 is a stress-engineered portion that is designed to self-destruct by fracturing in response to an applied energy. In some implementations, the second portion 102 is designed to remain intact after the stress-engineered portion fractures. As shown in the cross sectional view of FIG. 1 the stress-engineered portion 101 may be a structure including at least one tensile stress layer 115 having a residual tensile stress and at least one compressive stress layer 116 having a residual compressive stress. Tensile stress layer 115 and compressive stress layer 116 (collectively referred to herein as "stress-engineered layers") can be operably integrally connected together such that residual tensile and compressive stresses are self-equilibrating and produce a stress gradient. As set forth in additional detail below, the stress-engineered layers 116 and 115 may be fabricated in a variety of ways. For example, in some embodiments, the stress-engineered portion may be fabricated by post-treating a material using strategies similar to glass tempering (e.g., by way of heat or chemical treatment), or by depositing the layers using, for example chemical, vapor deposition techniques in which the deposition parameters (i.e., temperature, pressure, chemistry) are varied such that the layers collectively contain a significant inbuilt stress gradient. Note that the arrangement of stress-engineered layers 116 and 115 indicated in FIG. 1 is not intended to be limiting in that one or more stress-engineered and/or non-stressed substrate layers may be disposed on and/or between the two stress-engineered layers.

The stress-engineered portion 101 is designed so that an applied energy causes a small initial crack to form. In response to the formation of the small initial crack, stress within the layers is released and numerous fractures propagate in the layers from the initial crack. The propagating fractures cause the stress-engineered portion 101 of the device 100 to break into several or many fragments while the second portion 102 of the device 100 remains intact. According to some aspects, the fragments of the stress-engineered portion may be quite small and numerous. For example, the fragments may have length, width, and height dimensions of less than about 900 µm, less than about 500 µm, or even less than about 100 µm. Fracturing of the stress-engineered portion 101 changes the functionality of the device 100. According to some aspects, an energy delivery component 120 can be attached to the stress-engineered portion. The energy delivery component is configured to apply the energy that creates the initial crack to the stress-engineered portion 101.

Various methods may be used to fabricate the stress-engineered portion. One example approach involves thin film sputter deposition. In thin film sputter deposition, generally two distinct regimes can be identified leading to very different film morphology and characteristics, and result in either compressive or tensile stress. Metals are often used because of functionality (e.g., electrical properties), their structural qualities (e.g., ductility), and the fact that a conductive sputter target allows for a simple, high yield, glow discharge DC magnetron sputtering process. However, stress-engineered metal oxides and glasses (silicon oxides) can be sputtered as well; these insulating or semiconducting films can be sputter deposited by either radiofrequency (RF) sputtering or by reactive sputtering in a mixed inert/reactive gas plasma (e.g. argon/oxygen). To achieve reliable fragmentation of the stress-engineered portion, according to some embodiments, processes for fabricating the stress-engineered portion involves adapting stress-engineered thin film fabrication techniques with ion-exchange tempering to create stress profiles in glass (SiO2) substrates, e.g., glass (SiO2) substrates.

Figure 2:
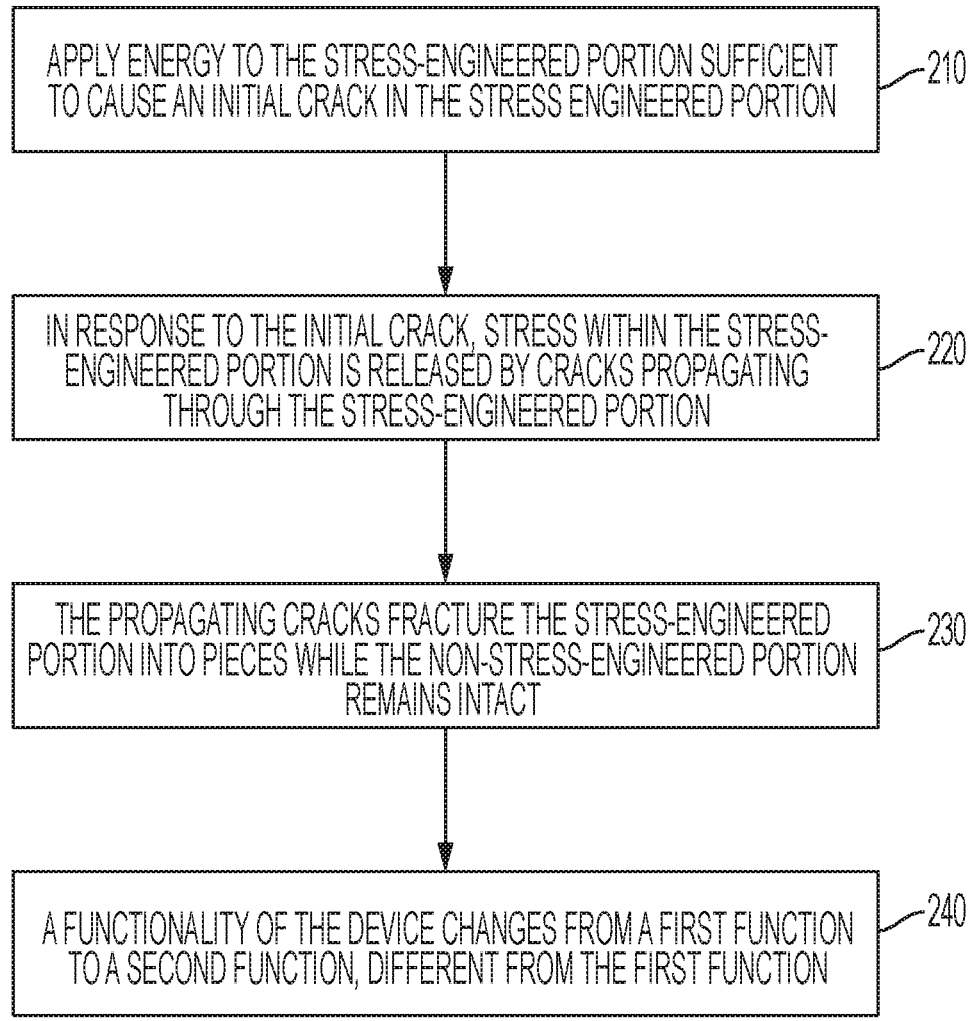
FIG. 2 is a flow diagram illustrating a method of changing functionality of a device in accordance with embodiments disclosed herein.

FIG. 2 is a flow diagram illustrating a method of changing functionality of a device in accordance with embodiments disclosed herein. The device includes at least one stress-engineered portion and at least one second portion. The stress-engineered portion comprises one or more tensile stress layers having residual tensile stress and one or more compressive stress layers having residual compressive stress. The tensile stress layers and the compressive stress layers are mechanically coupled such that the tensile stress layers and the compressive stress layers are self-equilibrating.

An applied energy causes 210 an initial crack in the stress-engineered portion of the device. In response to the initial crack, cracks propagate 220 from the initial crack through the stress-engineered portion. The propagating cracks fracture 230 the stress-engineered portion while the second portion remains substantially intact. Fracturing the stress-engineered portion without fracturing the second portion causes the functionality of the device to change 240 from a first function to a second function which is different from the first function. In some embodiments, the fractured stress-engineered portion is removed from the device and the removal of the stress-engineered portion changes the functionality of the device. In other embodiments, the fragments of the stress-engineered portion remain a part of the device and the presence of the fragments changes the functionality of the device.

Figure 3A:
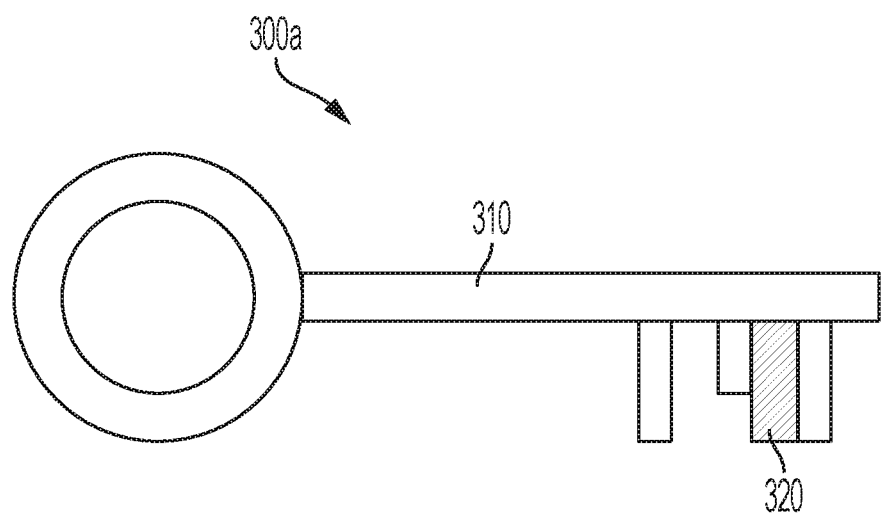
FIG. 3A illustrates a device in a first state that has a stress-engineered portion and a second portion and a first functionality.
Figure 3B:
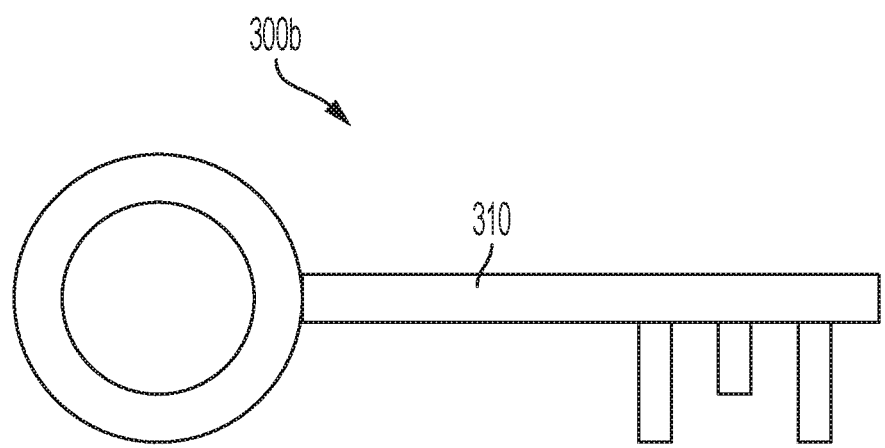
FIG. 3B illustrates the device is a second state after the stress-engineered portion has self-destructed and having a second functionality.

FIG. 3A illustrates a device 300a having a stress-engineered portion 320 and a second portion 310 and having a first functionality. The second portion 310 may be a portion that is not stress-engineered. In this example, devices 300a, 300b are illustrated as keys. The stress-engineered portion 320 may be fabricated separately and bonded to the second portion 310 in some implementations. Alternatively, both portions 310, 320 of the device 300a may be formed as an integral unit followed by a process that creates the tensile and compressive stresses in the material of the stress-engineered portion. FIG. 3B illustrates the device 300b after the stress-engineered portion 320 is fractured into pieces while the second portion 310 remains intact. Before the stress-engineered portion 320 is fractured, the device 300a is a key that has a first functionality, e.g., key 300a can open lock A. After the stress-engineered portion 320 is removed by fracturing, the device 300b is a key that has a second functionality which is different from the first functionality, e.g., key 300b can open lock B.

Although the functionality change is illustrated in FIGS. 3A and 3B using keys, the approaches disclosed herein are not limited to keys, but encompass any type of device whose functionality can be changed by removing a portion while leaving another portion intact. In the disclosed embodiments, the portion that is removed is a stress-engineered portion that self-destructs by fracturing when cracks propagate from an initial crack created in response to an applied energy. The change in functionality may comprise a change in the mechanical, electrical, and/or optical function of the device. FIGS. 4 through 16 illustrate devices wherein the mechanical functionality of the device is changed when the stress-engineered self-destructs. FIGS. 17 and 18 illustrate devices wherein the electrical functionality of the device is changed when the stress-engineered substrate fractures. FIGS. 17 and 18 illustrate devices wherein the electrical functionality of the device is changed when the stress-engineered substrate fractures. FIGS. 19 through 21 illustrate devices wherein the optical functionality of the device is changed when the stress-engineered substrate fractures.

In some implementations, self-destruction of the stress-engineered portion by fracturing causes a change in mass and/or change in volume of the device. In some implementations, the stress-engineered portion is arranged such that fracturing of the stress-engineered portion causes a change in shape of the device without substantially changing the mass and/or volume of the device.

According to some embodiments, illustrated in FIG. 4A, a trigger mechanism 450 that applies energy to the stress-engineered portion 420 to create the initial crack is disposed on the stress-engineered portion 420. For example, the trigger mechanism 450 may be a heater that, when activated, heats the surface of the stress-engineered portion. Heating the stress-engineered portion followed by cooling creates the initial crack from which the propagating cracks originate.

The trigger mechanism may supply mechanical energy, thermal energy, electrical energy, chemical energy, magnetic energy, and/or optical energy to create the initial fracture. The trigger mechanism may operate in response to a trigger signal that can be generated manually or by a sensor configured to sense trigger stimuli. The trigger stimuli may comprise one or more of electromagnetic radiation (e.g., radio frequency (RF) radiation, infrared (IR radiation), visible light, ultraviolet (UV) radiation, x-ray radiation, etc.), vibration, a chemical, vapor, gas, sound, temperature, passage of time, moisture, an environmental condition, etc. For embodiments in which the trigger stimulus is visible light, the sensor may be configured to generate the trigger signal in response to exposure to broadband light, such as sunlight or room light, or narrow band light, such as green, red, or blue visible light. For example, the green, red or blue light may be produced by a laser.

Figure 4C:
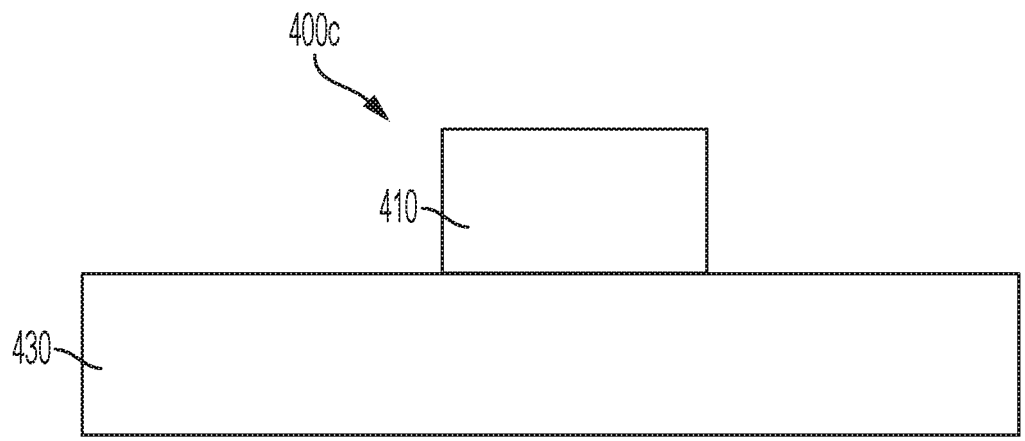

FIGS. 4A through 4C illustrate an embodiment wherein in its initial state 400a, the device includes a stress-engineered portion 420, a second portion 410 and a third portion 430. FIG. 4A shows the device 400 that is arranged such that the stress-engineered portion 420 is disposed between the second portion 410 and the third portion 430. A trigger mechanism 450 is disposed on the stress-engineered portion 420.

FIG. 4B shows the device in state 400b just after the stress-engineered portion 420 has self-destructed by fracturing. The fractures propagating in the stress-engineered portion 420 propagate to the trigger mechanism 450 and also destroy the trigger mechanism along with the portion 420. With the stress-engineered portion 420 removed, the second portion 410 moves toward the third portion 430 along the direction indicated by the arrow.

FIG. 4C shows the device in state 400c wherein second portion 410 is contacting the third portion 430. According to some implementations, the second portion 410 and the third portion 430 may comprise electrical contacts which are separated by the presence of the stress-engineered portion 430. After the stress-engineered portion 420 self-destructs, the second portion 410 makes electrical contact with the third portion 430.

Figure 5A:
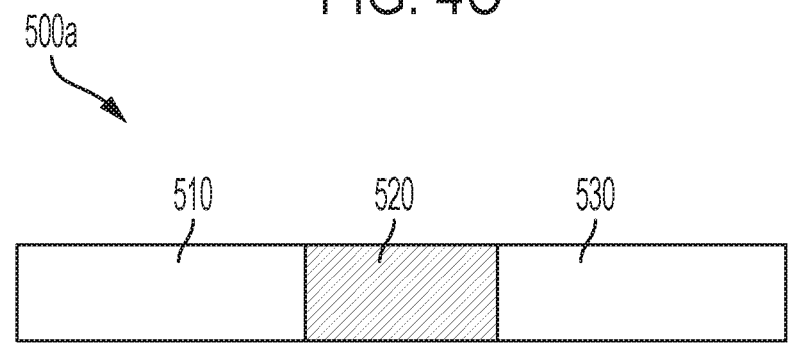
FIGS. 5A and 5B illustrate a device wherein self-destruction of the stress-engineered portion decouples first and second components in accordance with some embodiments.
Figure 5B:
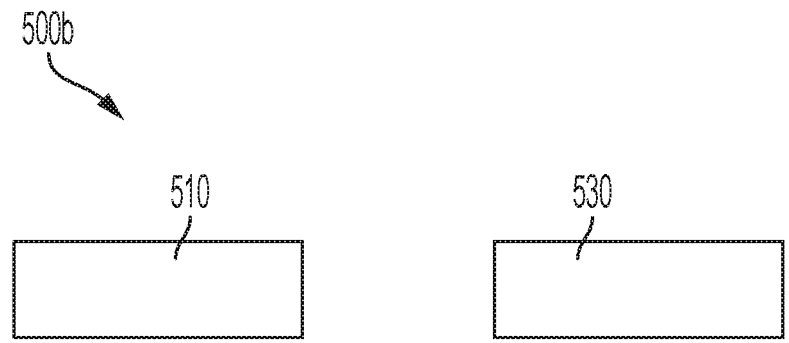

FIGS. 5A and 5B illustrate an embodiment wherein self-destruction of the stress-engineered portion separates the second portion 510 from a third portion. FIG. 5A illustrates a device in its initial state 500a, the device includes a second portion 510, a third portion 530, and a stress-engineered portion 520 that connects the second portion 510 and the third portion 530.

FIG. 5B shows the device in state 500b after the stress-engineered portion 520 has self-destructed by fracturing. With the stress-engineered portion 520 removed, the second portion 510 is de-coupled from the third portion 530. According to some implementations, the second portion 510 and the third portion 530 may comprise electrical contacts which are electrically connected by the presence of the stress-engineered portion 520. After the stress-engineered portion 520 self-destructs, the second portion 510 is electrically disconnected from the third portion 530.

Figure 6A:
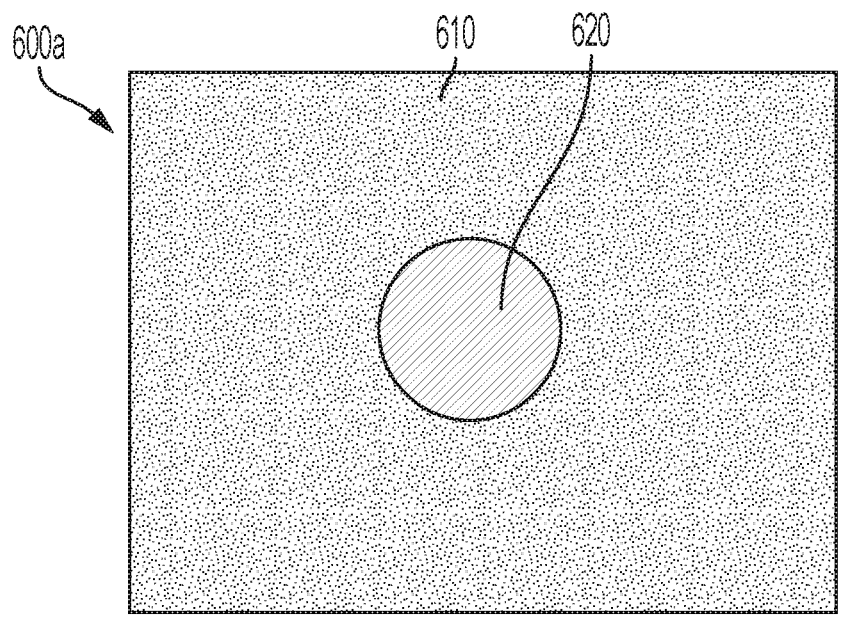
FIGS. 6A and 6B illustrate an embodiment wherein fracturing of the stress-engineered portion opens (unblocks) an aperture in the second portion in accordance with some embodiments.
Figure 6B:
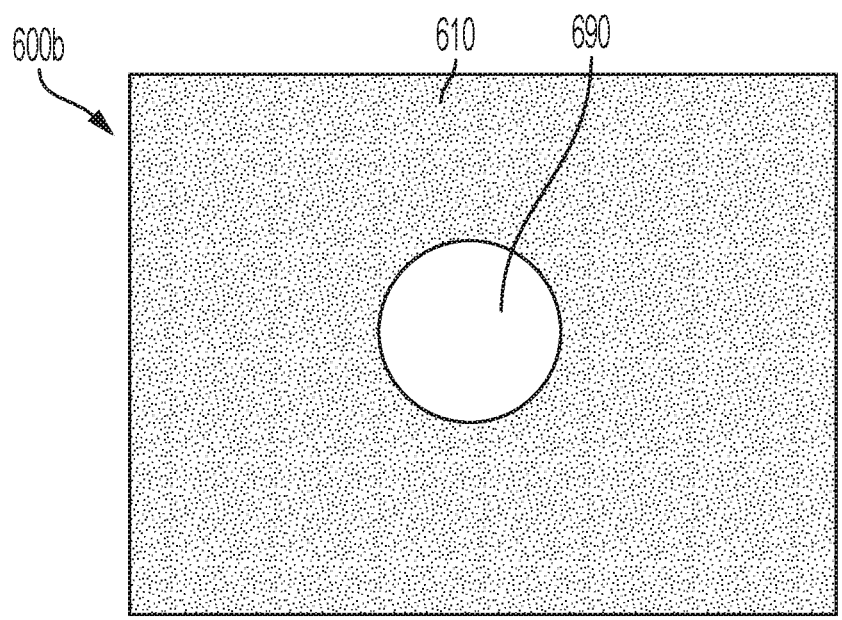

In some embodiments, the device is configured such that fracture of the stress-engineered portion unblocks an aperture as illustrated in FIGS. 6 and 7. FIGS. 6A and 6B illustrate an embodiment wherein fracturing of the stress-engineered portion 620 opens (unblocks) an aperture in the second portion 610. FIG. 6A illustrates a device in its initial state 600a, the device includes a second portion 610 and a stress-engineered portion 620 blocking an aperture 690 in the second portion 610.

FIG. 6B shows the device in state 600b after the stress-engineered portion 6520 has self-destructed by fracturing. With the stress-engineered portion 620 removed, the aperture 690 in the second portion 610 is unblocked.

Figure 7A:
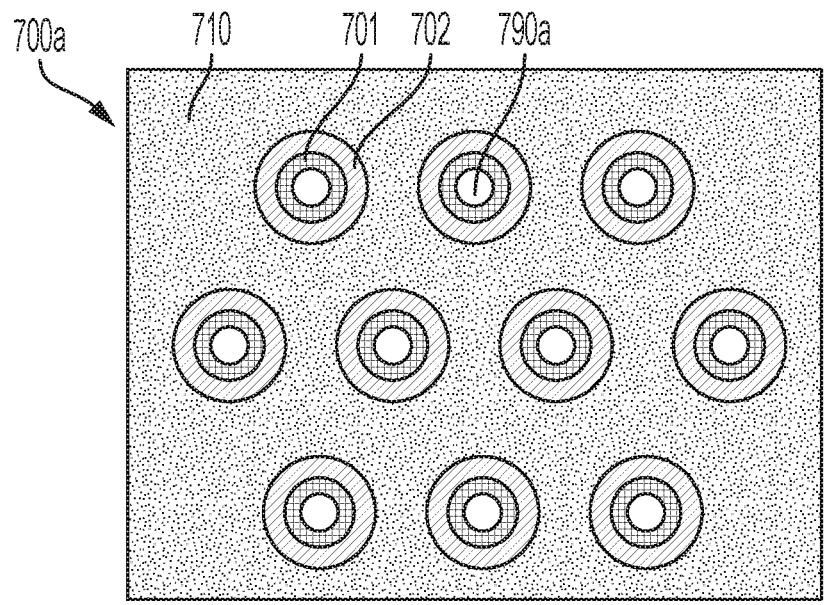
FIGS. 7A through 7C illustrate a sieve wherein self-destruction of the stress-engineered portion causes a change in the functionality of the sieve in accordance with some embodiments.
Figure 7B:
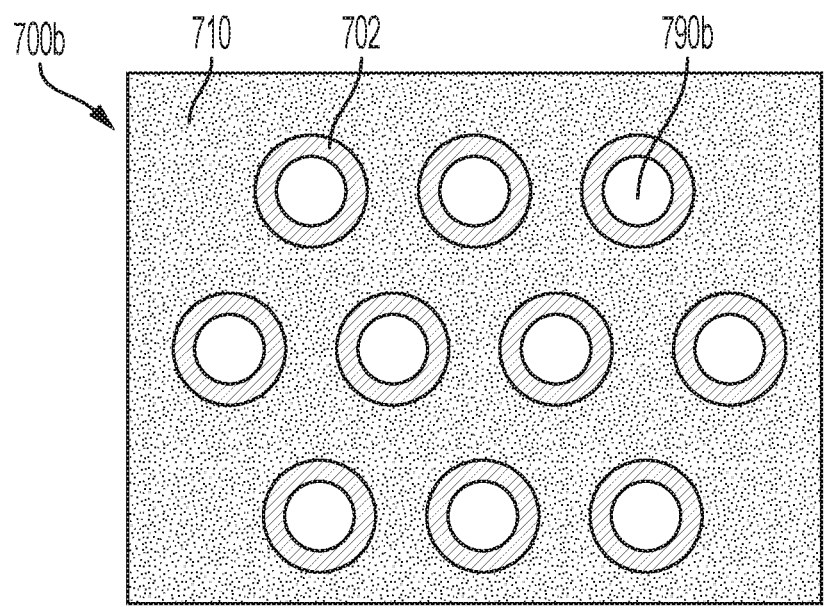
Figure 7C:
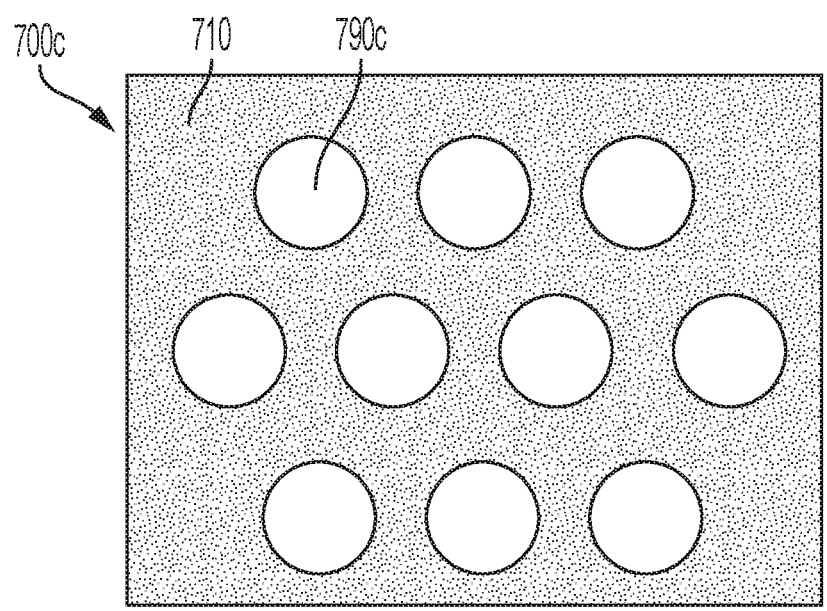

FIGS. 7A through 7C illustrate an embodiment in which the device is a sieve. FIG. 7A illustrates a device in its initial state 700a, the device includes a second portion 710 and a stress-engineered portions 720-1, 720-2 partially blocking apertures 790 in the second portion 710. In state 700a, particles having a first diameter can pass through apertures 790a of the sieve. FIG. 7B shows the device in state 700b after the stress-engineered portion 720-1 has self-destructed by fracturing. With the stress-engineered portion 720-1 removed, the apertures 790b in the sieve are larger and allow the passage of particles having a second diameter, which is larger than the first diameter, to pass through the sieve. FIG. 7C shows the device in state 700c after the stress-engineered portion 720-2 has self-destructed by fracturing. With the stress-engineered portion 720-2 removed, the apertures 790c in the sieve are larger and allow the passage of particles having a third diameter, which is larger than the second diameter, to pass through the sieve. The device may include one or more additional stress-engineered portions, wherein removal of the one or more additional stress-engineered portions changes the functionality of the sieve to pass larger diameter particles.

Figure 8A:
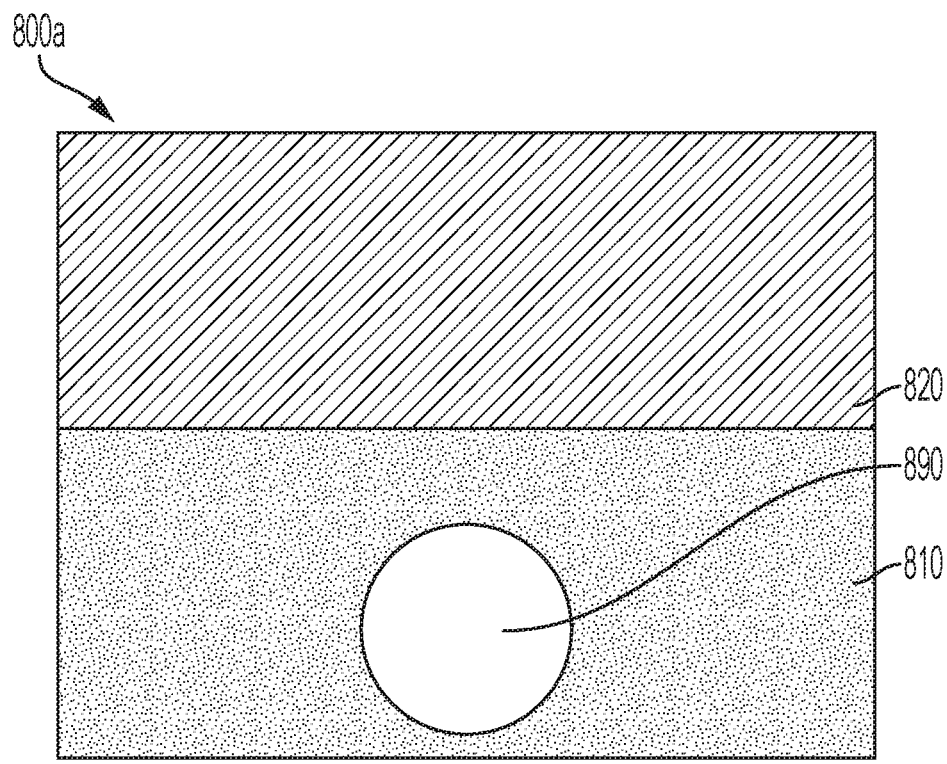
FIGS. 8A and 8B illustrate an embodiment wherein fracturing of the stress-engineered portion blocks an aperture in the second portion.
Figure 8B:
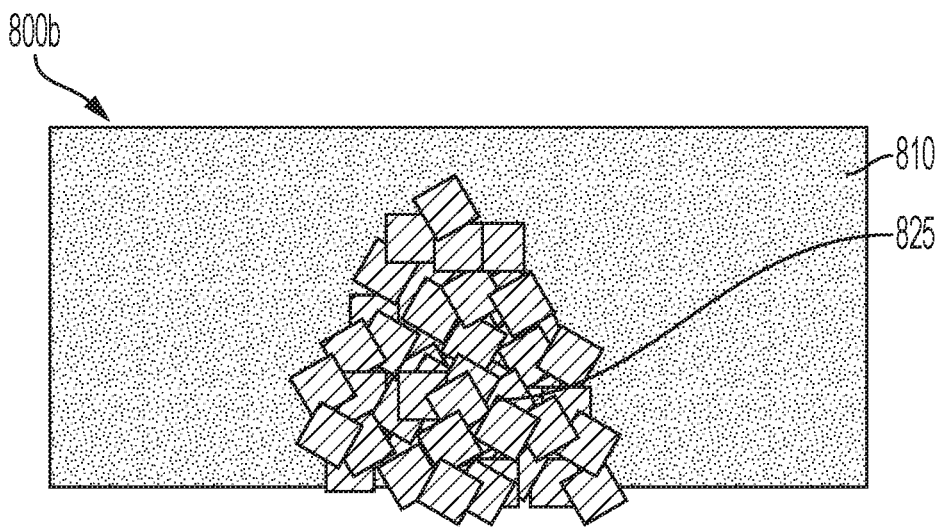

FIGS. 8A and 8B illustrate an embodiment wherein fracturing of the stress-engineered portion 820 blocks an aperture 890 in the second portion 810. FIG. 8A illustrates a device in its initial state 800a, the device includes a second portion 810 having an aperture 890 and a stress-engineered portion 820.

FIG. 8B shows the device in state 800b after the stress-engineered portion 820 has self-destructed by fracturing. Fragments 825 of the stress-engineered portion 820 fall in front of aperture 890, blocking the aperture 890.

In some embodiments, the stress-engineered portion is arranged such that fracture of the stress-engineered portion is configured to cause connection or disconnection of first and second containers.

Figure 9A:
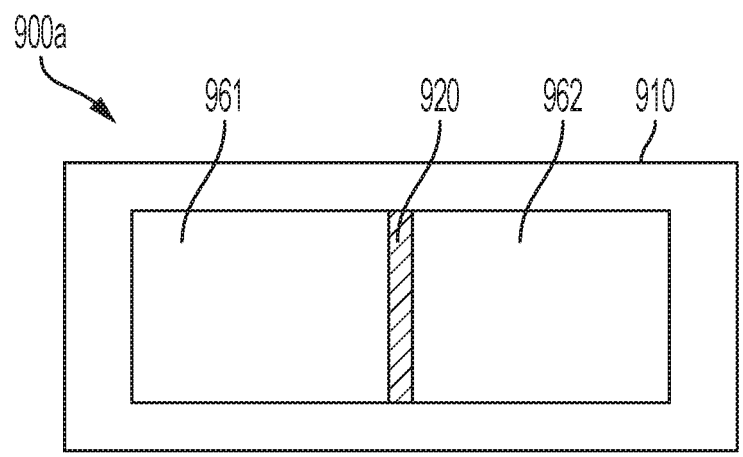
FIGS. 9A and 9B illustrate an embodiment in which fracture of the stress-engineered portion connects two containers.
Figure 9B:
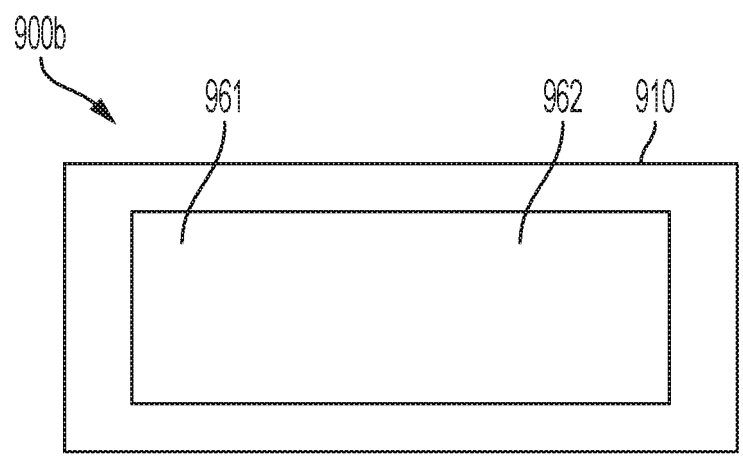

FIGS. 9A and 9B illustrate an embodiment in which fracture of the stress-engineered portion connects two containers. FIG. 9A illustrates a device in a first state 900a wherein the second portion 910 forms an enclosure that is separated into two containers 961, 962 by the stress-engineered portion 920.

FIG. 9B shows the device in state 900b after the stress-engineered portion 920 has self-destructed by fracturing. Fracturing the stress-engineered portion connects the two containers 961, 962.

Figure 10A:
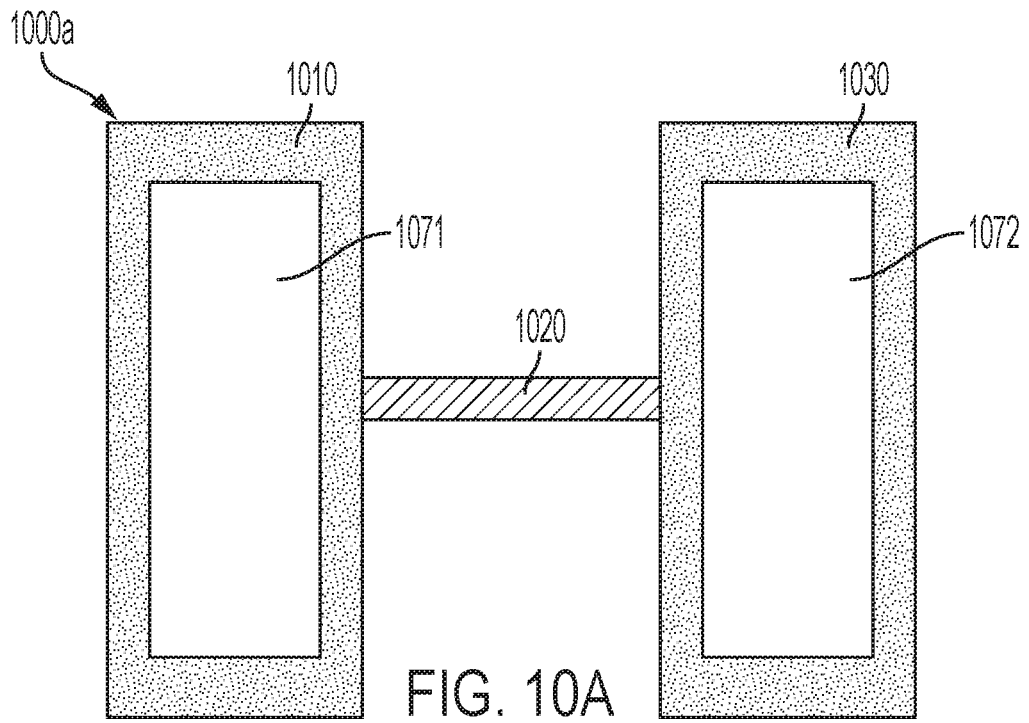
FIGS. 10A and 10B illustrate an embodiment in which fracture of the stress-engineered portion disconnects two containers.
Figure 10B:
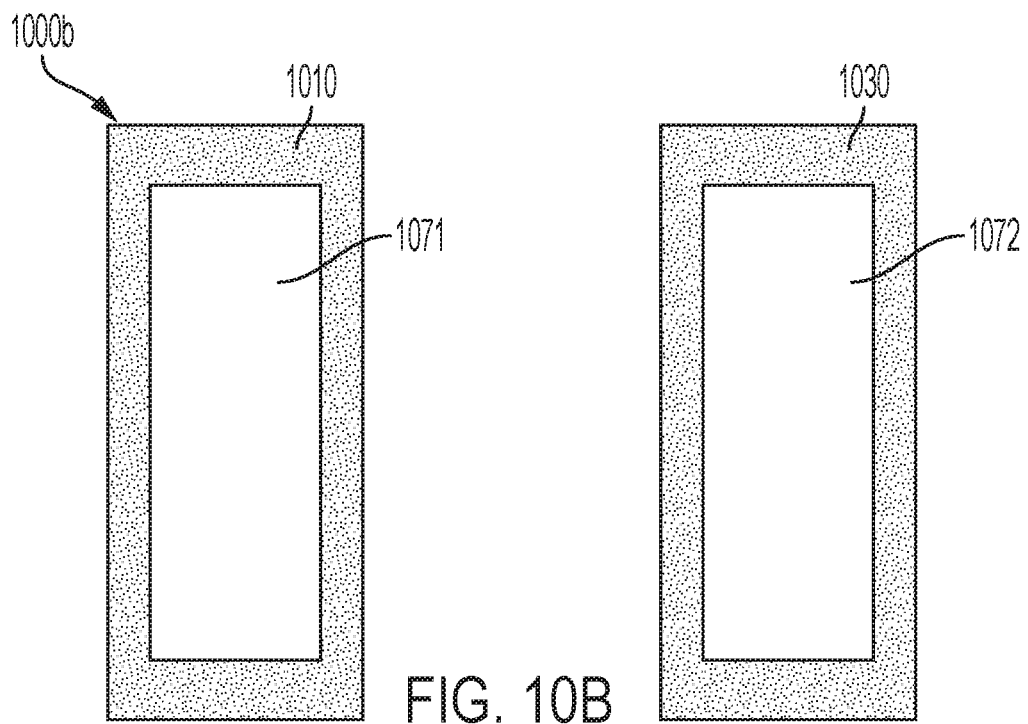

FIGS. 10A and 10B illustrate an embodiment in which fracture of the stress-engineered portion disconnects two containers. FIG. 10A illustrates a device in a first state 1000a wherein the second portion 1010 is container having an interior volume 1071 fluidically connected to another the interior volume 1072 of a second enclosure 1030. Stress-engineered portion 1020 comprises a tube that fluidically connects the interior volumes 1071, 1072 of the enclosures 1010 and 1030.

FIG. 10B shows the device in state 1000b after the stress-engineered portion 1020 has self-destructed by fracturing. Fracturing the stress-engineered portion 1020 fluidically disconnects the two containers 1010, 1030.

According to some implementations, the self-destruction of the stress-engineered portion can cause or allow the second portion to change position. For example, the self-destruction of the stress-engineered portion can change the mobility of the second portion, causing or allowing the second portion to become mobile.

Figure 11A:
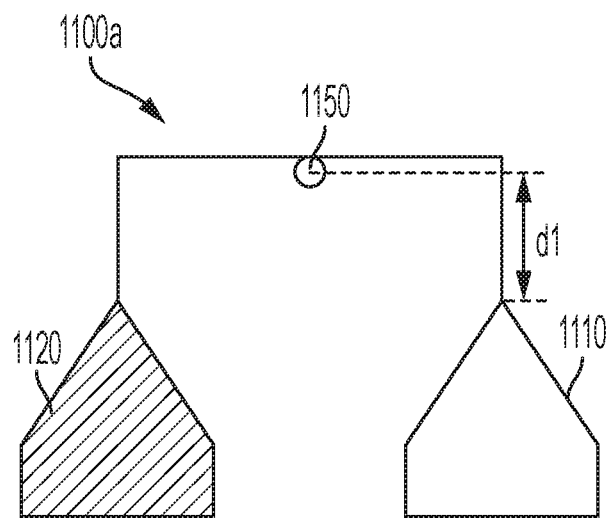
FIGS. 11A and 11B illustrate an embodiment in which fracture of the stress-engineered portion causes the position of the second portion to change.
Figure 11B:
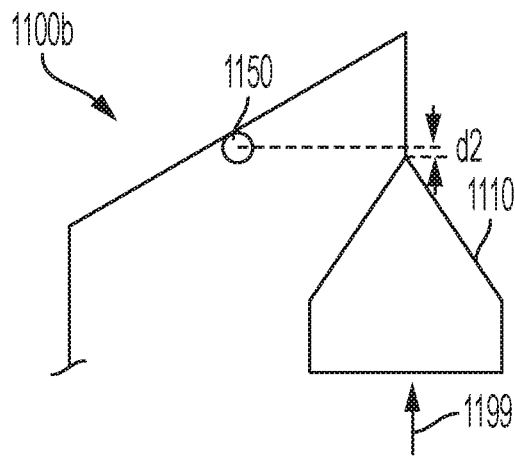

FIGS. 11A and 11B illustrate an embodiment in which fracture of the stress-engineered portion causes the position of the second portion to change. FIG. 11A illustrates a device in a first state 1100a wherein the stress-engineered portion 1120 and the second portion 1110 are balanced on a fulcrum 1150. The second portion 1110 is in a position that is a distance d1 from a reference point which in this example is the center of the fulcrum.

FIG. 11B shows the device in state 1100b after the stress-engineered portion 1120 has self-destructed by fracturing. Fracturing the stress-engineered portion 1120 causes the second portion 1110 to move along the direction of arrow 1199 to a position that is a distance d2 from the reference point.

Figure 12A:
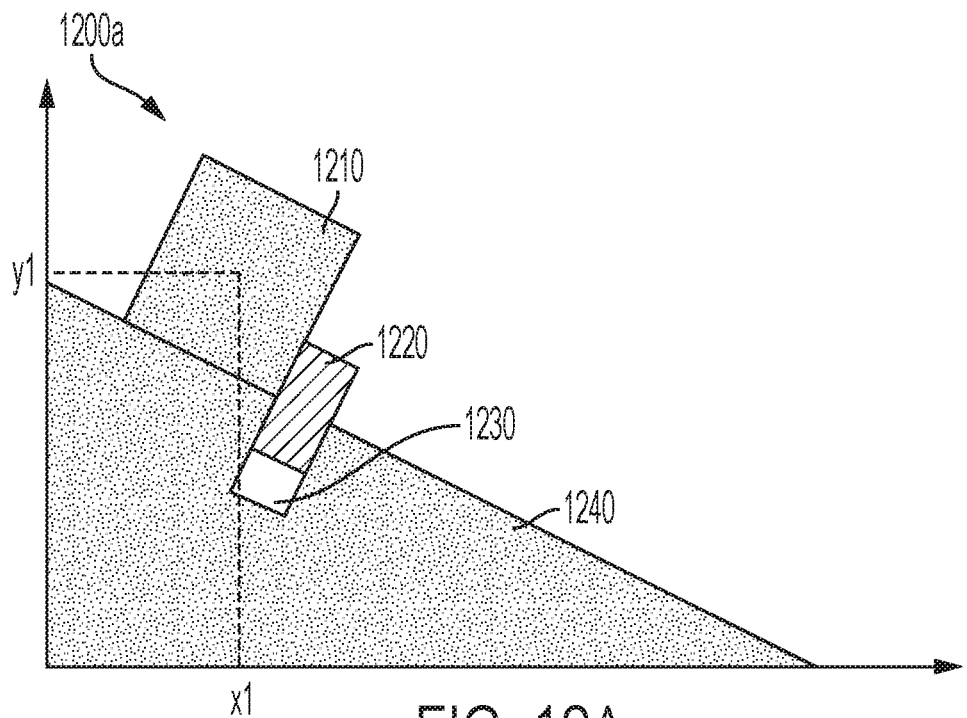
FIGS. 12 and 12B illustrate another embodiment in which fracture of the stress-engineered portion causes the position of the second portion to change.
Figure 12B:
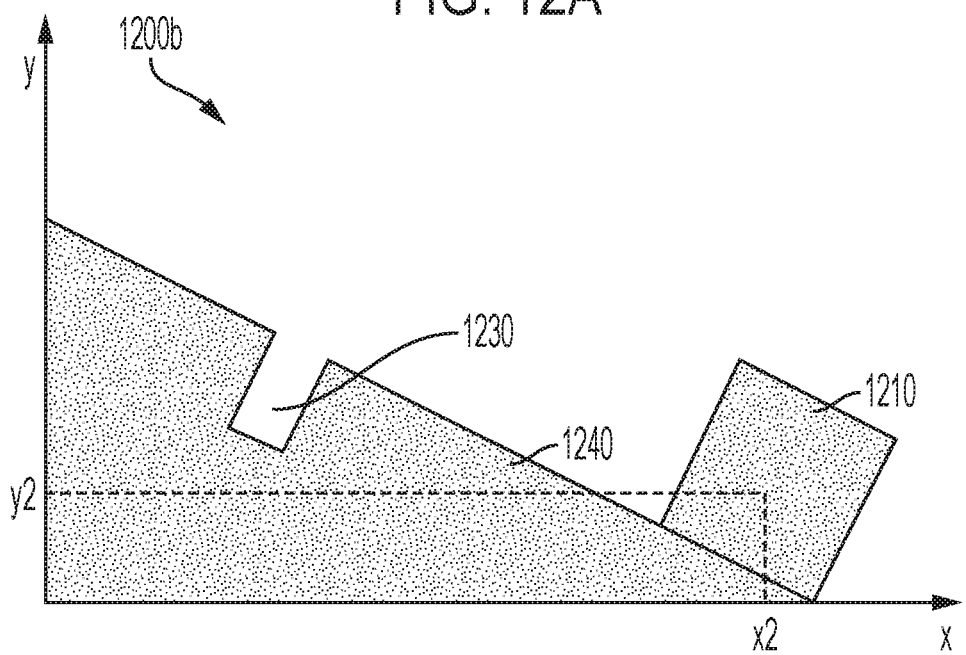

FIGS. 12A and 12B provide another example in which fracture of the stress-engineered portion causes the position of the second portion to change. FIG. 12A illustrates a device in a first state 1200a wherein the stress-engineered portion 1220 is a peg inserted into a tapered hole of an inclined plane 1240. The second portion 1210 is held in place by the stress-engineered portion 1220 at position (x=x1, y=y1).

FIG. 12B shows the device in state 1200b after the stress-engineered portion 1220 has self-destructed by fracturing. Fracturing the stress-engineered portion 1220 allows the second portion 1210 to move along the inclined plane 1240 to a position (x=x2, y=y2), where x1≠x2 and y1≠y2.

In some embodiments, the stress-engineered portion is arranged such that self-destruction of the stress-engineered portion causes a change in a surface characteristic of the device.

Figure 13A:
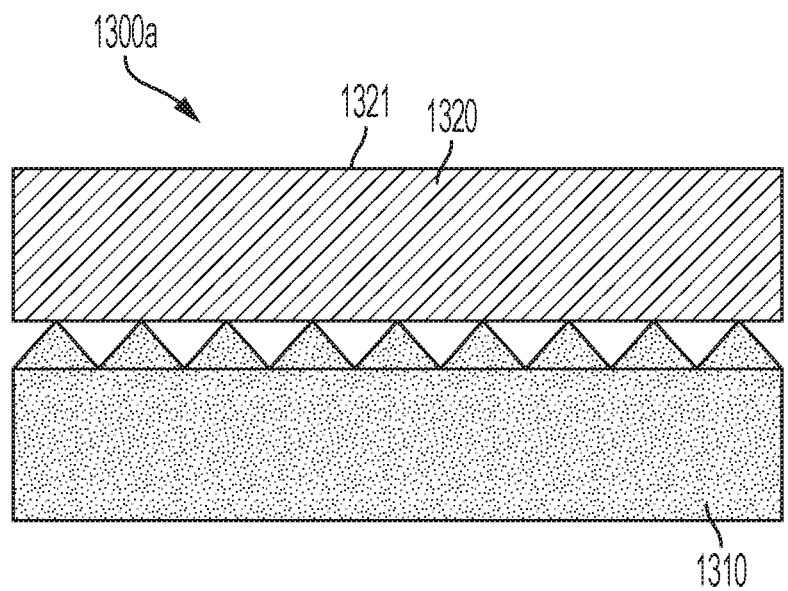
FIGS. 13A and 13B provide an example in which fracture of the stress-engineered portion causes a change in the surface characteristic of the device.
Figure 13B:
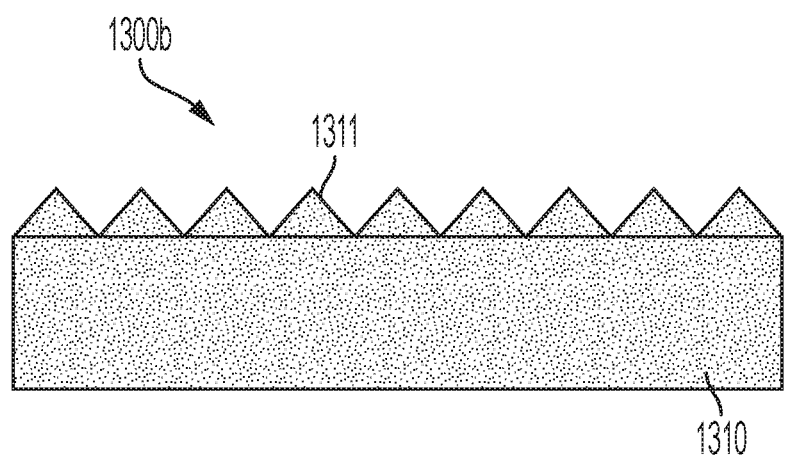

FIGS. 13A and 13B provide example in which fracture of the stress-engineered portion causes a change in the surface characteristic of the device. FIG. 13A illustrates a device in a first state 1300a wherein the stress-engineered portion 1320 is a layer having a smooth outer surface 1321 disposed on the second portion 1310.

FIG. 13B shows the device in state 1300b after the stress-engineered portion 1320 has self-destructed by fracturing. Fracturing the stress-engineered portion 1320 exposes a microstructured surface 1311 on the second portion 1310 and changes the surface structure of the device from smooth to rough.

According to some embodiments, fracturing the stress-engineered portion causes a change in the mechanical resonance of the device.

Figure 14A:
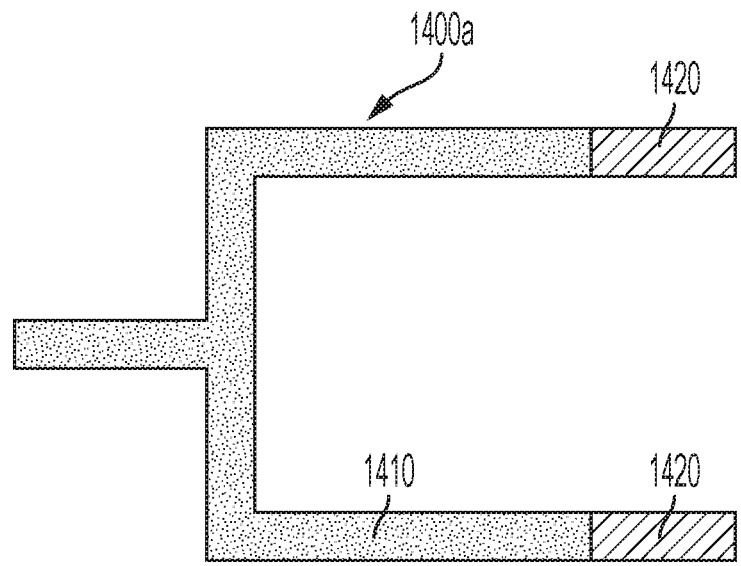
FIGS. 14A and 14B provide an example in which fracture of the stress-engineered portion causes a change in the mechanical resonance of the device.
Figure 14B:
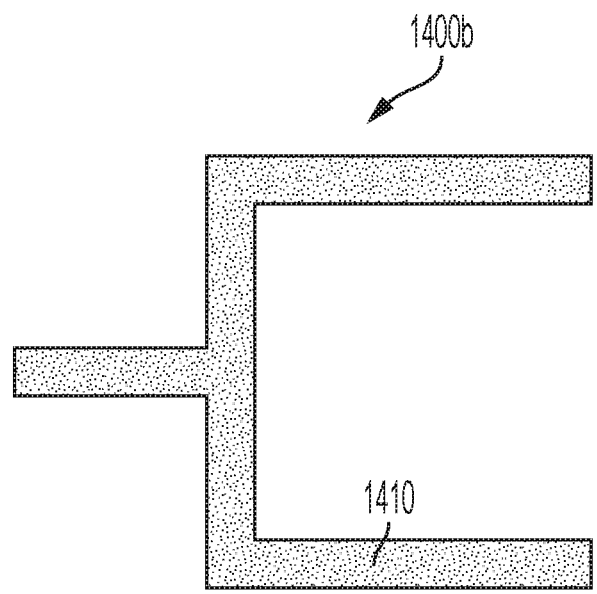

FIGS. 14A and 14B provide example in which fracture of the stress-engineered portion causes a change in the mechanical resonance of the device. FIG. 14A illustrates a device that is a tuning fork in a first state 1400a. In the first state 1400a, the tuning fork has a first mechanical resonance.

FIG. 14B shows the tuning fork in state 1400b after the stress-engineered portion 1420 has self-destructed by fracturing. Fracturing the stress-engineered portion 1420 changes the mechanical resonance of the tuning fork from the first mechanical resonance to a different second mechanical resonance.

According to some embodiments, fracturing the stress-engineered portion causes the second portion to change shape.

Figure 15A:
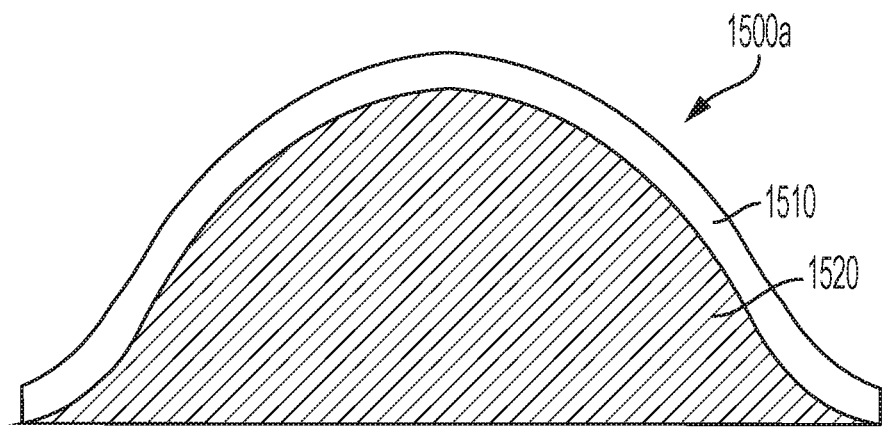
FIGS. 15A and 15B provide an example in which fracture of the stress-engineered portion causes the second portion to change shape.
Figure 15B:

FIGS. 15A and 15B provide example in which fracture of the stress-engineered portion 1520 causes the second portion 1510 to change shape. FIG. 15A illustrates a device in a first state 1500a wherein the second portion 1510 is a flexible film disposed over a curved surface of a stress-engineered portion.

FIG. 15B shows the device in a second state 1500b after the stress-engineered portion 1520 has self-destructed by fracturing. Fracturing the stress-engineered portion 1520 allows the flexible film 1510 to resume its previously flat shape.

According to some embodiments, a stress-engineered portion provides volume control in the event that a second portion is broken.

Figure 16A:
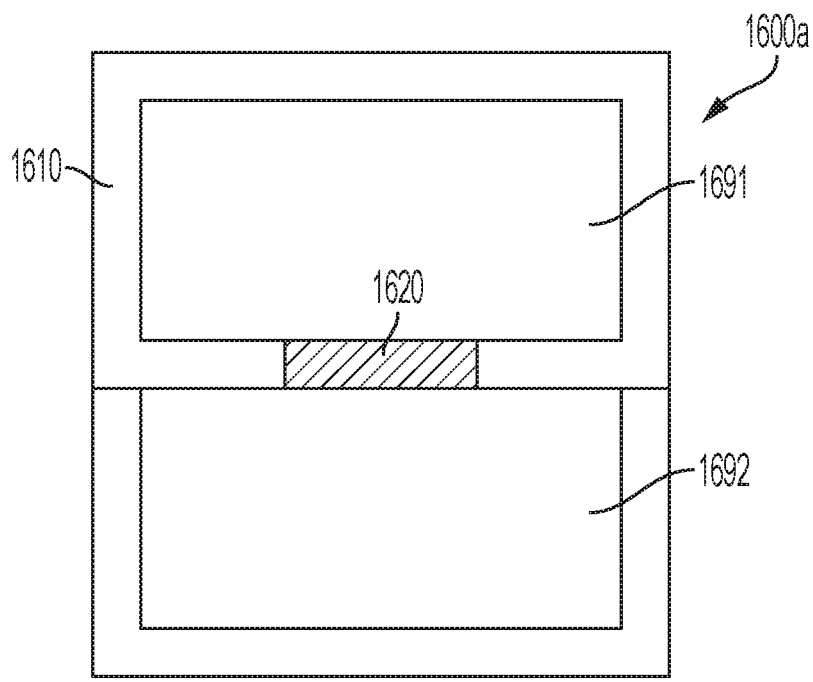
FIGS. 16A and 16B illustrate the concept of volume control in accordance with some embodiments.
Figure 16B:
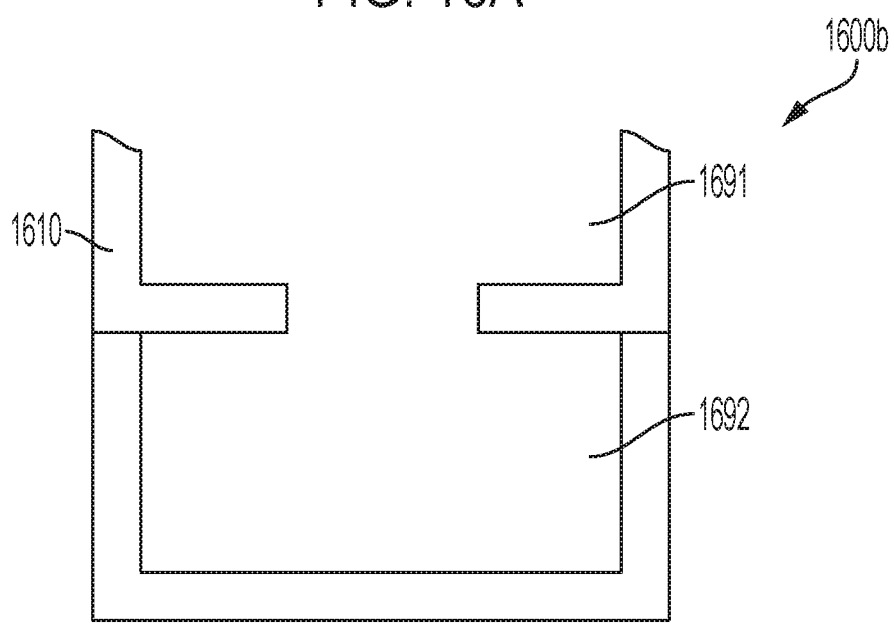

FIGS. 16A and 16B illustrate the concept of volume control in accordance with some embodiments. FIG. 16A illustrates a device in a first state 1600a wherein the second portion 1610 which may be a second structure, at least partially encloses an interior volume 1691. A third portion 1630 encloses a back-up volume 1692. Stress-engineered portion 1620 is disposed between volume 1691 and volume 1692.

When the second portion 1610 is fractured, the fractures within the second portion 1610 do not result in propagating fractures that destroy the second portion 1610. The energy that causes the fracturing of the second portion 1610 is transmitted through the second portion 1610 to the stress-engineered portion 1620 causing the stress-engineered portion 1620 to self-destruct.

FIG. 16B shows the device in a second state 1600b after the second portion 1610 is fractured and the stress-engineered portion 1620 has self-destructed. Fracture of the second portion compromises volume 1681. Self-destruction of the stress-engineered portion 1620 opens backup volume 1692. With the self-destruction of the stress-engineered portion 1620, the backup volume 1692 is fluidically coupled to what is left of volume 1691 such that anything previously contained in volume 1691 is now contained by backup volume 1692.

Some embodiments are directed to a device that includes a stress-engineered portion and a second portion wherein self-destruction of the stress-engineered portion changes an electrical functionality of the device. For example, self-destruction of the stress-engineered portion may electrically connect or electrically disconnect a first electrical component from a second electrical component. In some implementations, electrically connecting or electrically disconnecting a first electrical component from a second electrical component changes data stored in the device.

Figure 17A:
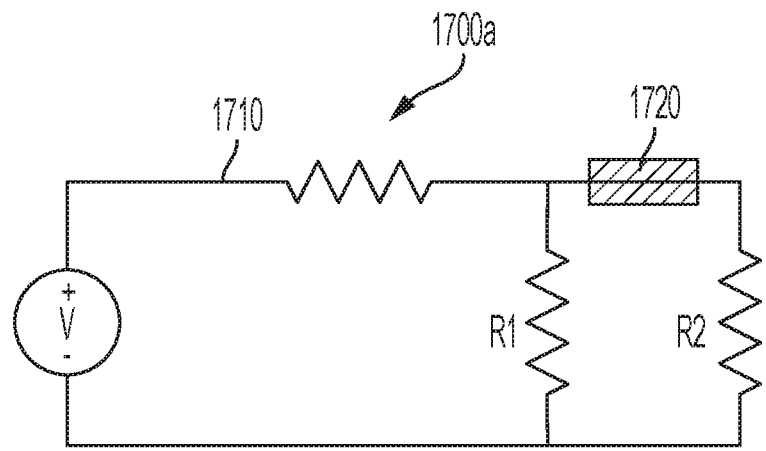
FIGS. 17A and 17B illustrate first and second electrical components that are disconnected when the stress-engineered portion self-destructs in accordance with some embodiments.
Figure 17B:
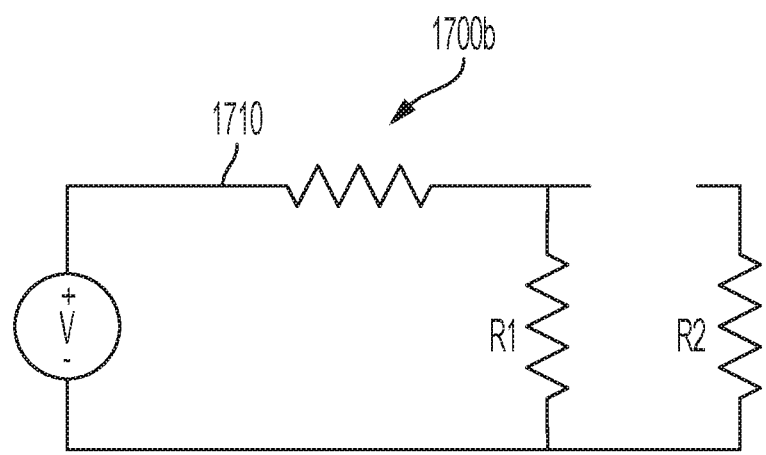

FIGS. 17A and 17B illustrate first and second electrical components that are disconnected when the stress-engineered portion self-destructs. FIG. 17A shows an electrical device in a first state 1700a wherein the circuit 1710 includes resistors R1 and R2 that are electrically connected in parallel by stress-engineered portion 1710. In this embodiment, stress-engineered portion 1720 comprises an electrically conductive trace that electrically connects R1 and R2.

FIG. 17B shows the device in a second state 1700b after the stress-engineered portion 1720 has self-destructed. Fracture of the stress-engineered portion 1720 disconnects R1 from R2.

Figure 18A:
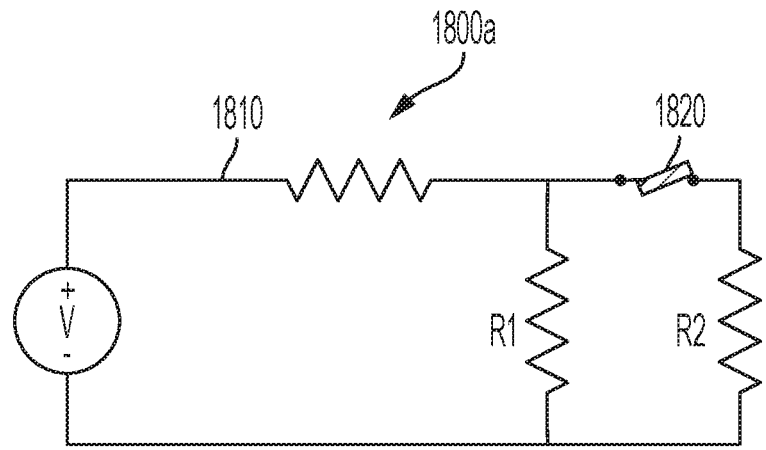
FIGS. 18A and 18B illustrate a scenario wherein first and second electrical components are connected when the stress-engineered portion self-destructs in accordance with some embodiments.
Figure 18B:
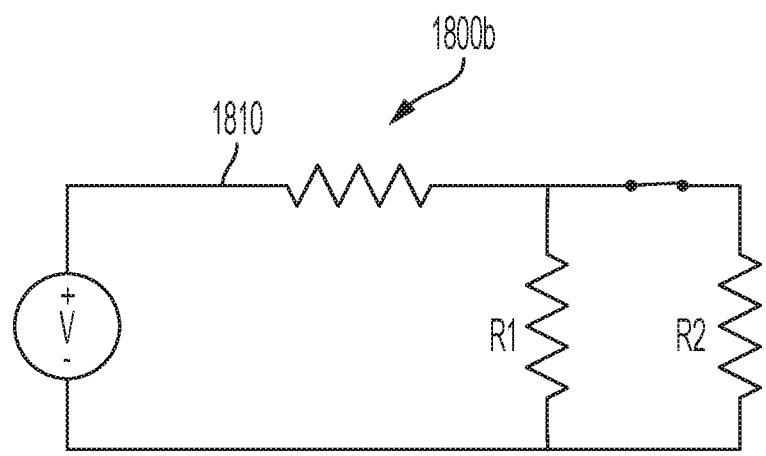

FIGS. 18A and 18B illustrate a scenario wherein first and second electrical components are connected when the stress-engineered portion self-destructs. FIG. 18A shows an electrical device in a first state 1800a wherein the circuit 1810 includes a resistor R1 and a switch S1. Switch S1 includes stress-engineered portion 1820 which maintains the switch S1 in the open position. When S1 is open, R1 and R2 are electrically disconnected.

FIG. 18B shows the device in a second state 1800b after the stress-engineered portion 1820 has self-destructed. Fracture of the stress-engineered portion 1820 closes switch S1, electrically connecting R1 and R2.

According to some embodiments, fracturing the stress-engineered portion causes a change in the electrical resonance of the device.

Figure 19A:
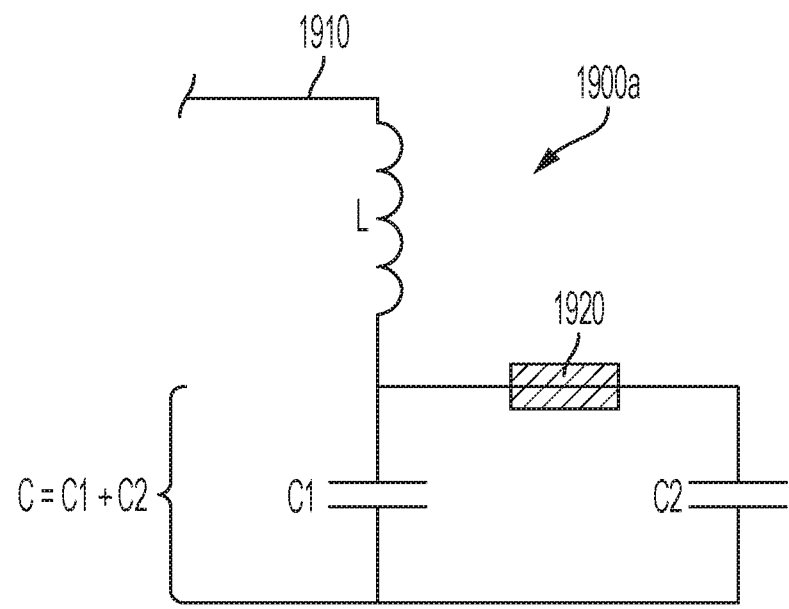
FIGS. 19A and 19B provide an example in which fracture of the stress-engineered portion causes a change in the electrical resonance of the device in accordance with some embodiments.
Figure 19B:
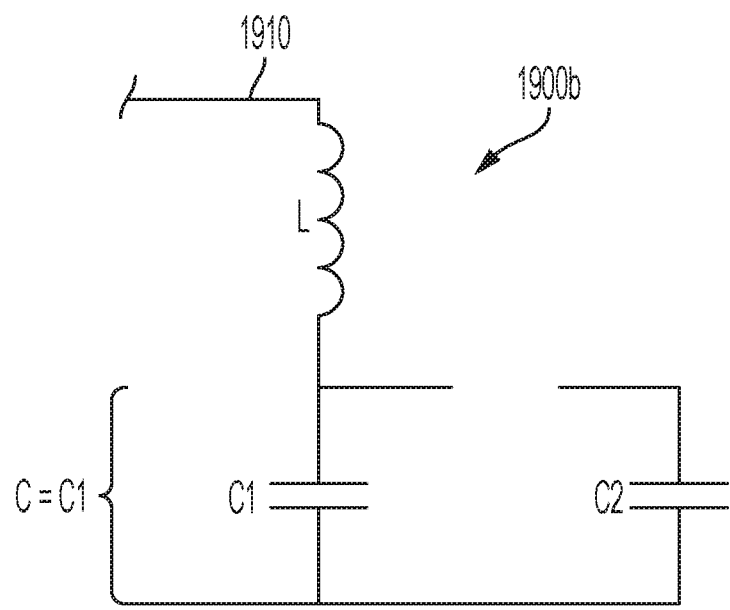

FIGS. 19A and 19B provide example in which fracture of the stress-engineered portion causes a change in the electrical resonance of the device. FIG. 19A illustrates a tank circuit 1910 in a first state 1900a. In state 1900a, the tank circuit 1910 has a first electrical resonance which is based on the values of the inductance L and the capacitance C of the tank circuit. When the device 1910 is in state 1900a, the capacitance of the tank circuit, C, is equal to the sum of the parallel connected capacitors C1 and C2. The stress-engineered portion 1920 electrically connects C1 and C2.

FIG. 19B shows the tank circuit 1910 in state 1900b after the stress-engineered portion 1920 has self-destructed by fracturing. Fracturing the stress-engineered portion 1920 electrically disconnects capacitor C2 from the tank circuit 1910. In state 1900b, the capacitance of the tank circuit is C1 and the tank circuit 1910 has a second resonance that is different from the first resonance Some embodiments are directed to a device that includes a stress-engineered portion and a second portion wherein self-destruction of the stress-engineered portion changes an optical functionality of the device. For example, as illustrated in FIGS. 20A through 21B, self-destruction of the stress-engineered portion may change optical transmissivity or reflectivity of the device.

Figure 20A:
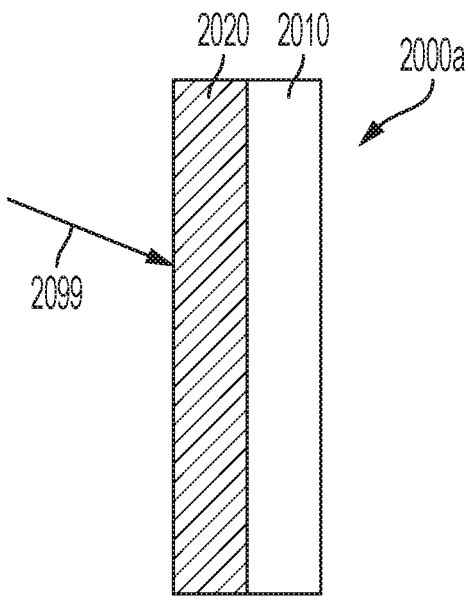
FIGS. 20A and 20B provide an example in which fracture of the stress-engineered portion causes a change in reflectivity of the device in accordance with some embodiments.
Figure 20B:
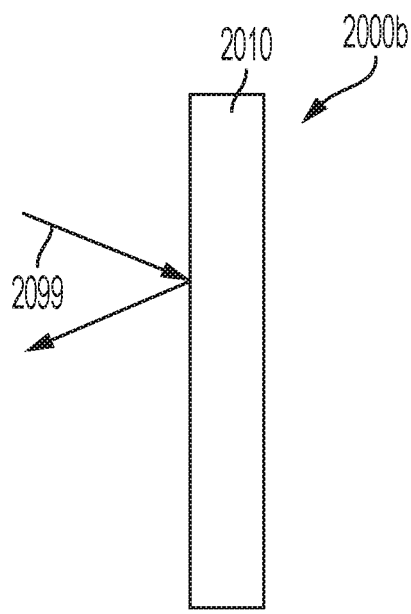

FIGS. 20A and 20B provide example in which fracture of the stress-engineered portion causes a change in optical reflectivity of the device. FIG. 20A illustrates a device in a first state 2000a having a stress-engineered optical layer 2020 that is optically opaque and a second layer 2010 that is optically reflective. In state 2000a, the optically opaque stress-engineered layer 2020 prevents light 2099 from being reflected by reflecting layer 2010.

FIG. 20B shows the device in state 2000b after the stress-engineered portion 1920 has self-destructed by fracturing. In state 2000b, light 2099 is reflected by layer 2010.

Figure 21A:
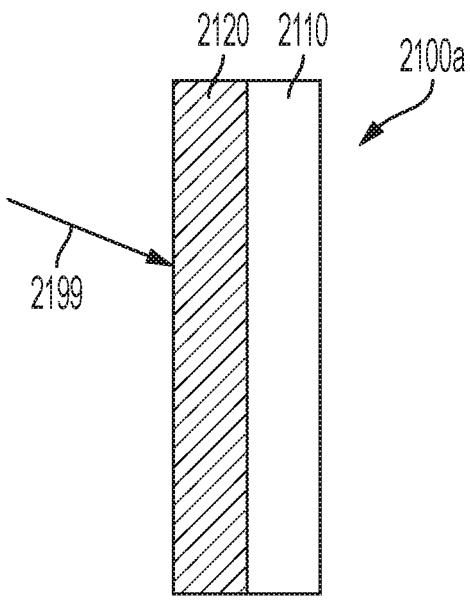
FIGS. 21A and 21B provide an example in which fracture of the stress-engineered portion causes a change in optical transmissivity of the device in accordance with some embodiments.

FIG. 21A illustrates a device in a first state 2100a having a stress-engineered optical layer 2120 that is optically opaque and a second layer 2110 that is optically transmissive. In state 2100a, the optically opaque stress-engineered layer 2120 prevents light 2199 from being transmitted by transmissive layer 2110.

Figure 21B:
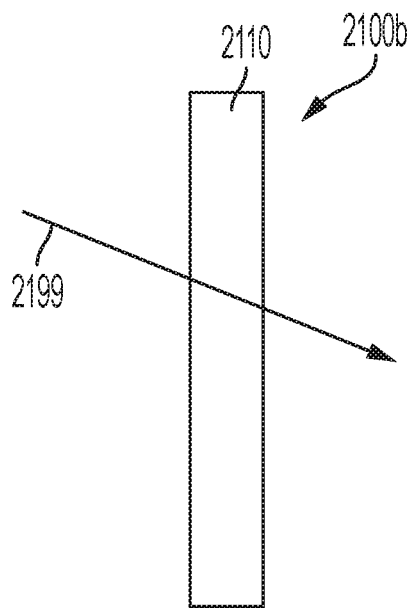

FIG. 21B shows the device in state 2100b after the stress-engineered portion 2020 has self-destructed by fracturing. In state 2100b, light 2199 is reflected by layer 2110.

Figure 22A:
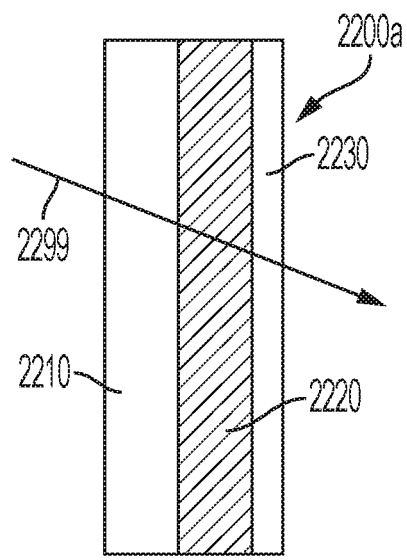
FIGS. 22A and 22B provide an example in which fracture of the stress-engineered portion causes a change in optical scattering of the device in accordance with some embodiments.
Figure 22B:
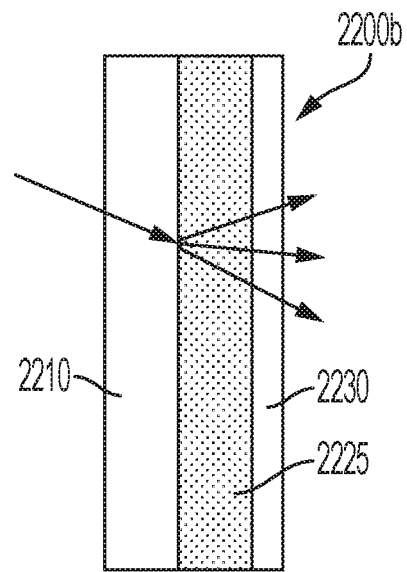

In some embodiments, as illustrated in FIGS. 22A and 22B, self-destruction of the stress-engineered portion may change optical scattering of the device.

FIG. 22A illustrates a device in a first state 2200a having a stress-engineered optical layer 2220 that exhibits low scattering and is sandwiched between a second layer 2210 and a third layer 2230. In state 2200a, the device transmits light 2299 with relatively low scattering.

FIG. 22B shows the device in state 2200b after the stress-engineered layer 2220 has self-destructed by fracturing. In state 2200*b*, the fragments 2225 of the stress-engineered layer are trapped between the second and third layers 2210, 2230. The trapped fragments 2225 provide scattering sites for light 2299 passing through the device. Due to the trapped fragments 2225, in state 2200*a*, the device transmits light 2299 with relatively higher scattering.

According to some embodiments, self-destruction of the stress-engineered layer causes a change in the optical band pass of the device.

Figure 23A:
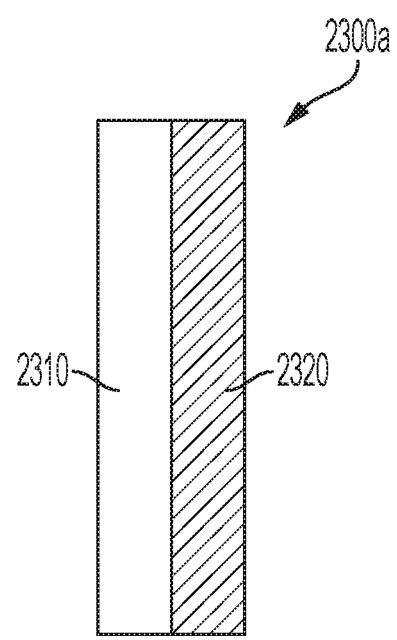
FIGS. 23A and 23B provide an example in which fracture of the stress-engineered portion causes a change in the wavelength pass band of the device in accordance with some embodiments.

FIG. 23A illustrates a device in a first state 2300*a* having a stress-engineered optical layer 2320 that has a narrow optical bandpass arranged on a second layer 2310 that has a wide optical bandpass. In state 2300*a*, the device transmits light within the narrow bandpass of the stress-engineered layer 2320 and blocks other wavelengths.

Figure 23B:
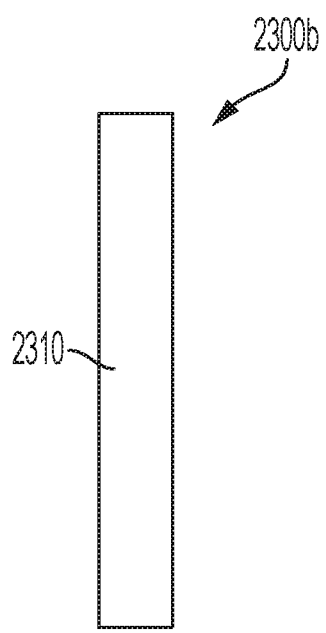

FIG. 23B shows the device in state 2300*b* after the stress-engineered layer 2320 has self-destructed by fracturing. In state 2300*b*, the device transmits light within the wide bandpass of the second layer 2310.

Figure 24A:
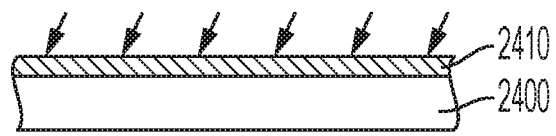
FIGS. 24A to 24E illustrate a first methodology in which a stress-engineered substrate is fabricated in accordance with some embodiments.
Figure 24B:
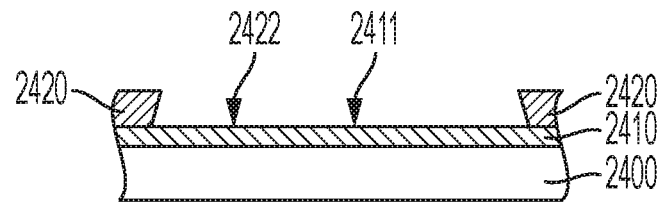
Figure 24C:
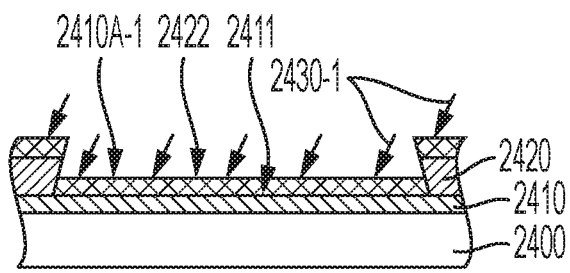
Figure 24D:
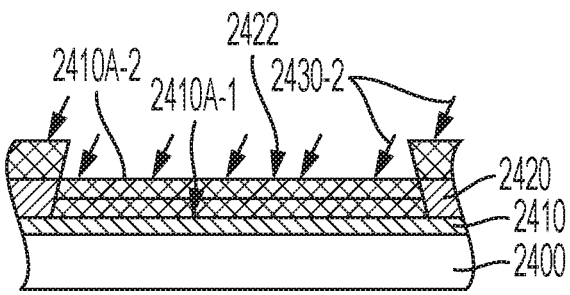
Figure 24E:

FIGS. 24A to 24E illustrate a first methodology in which a stress-engineered support substrate 2410A is built up by patterned $SiO_2$ stress-engineered support substrates generated entirely using plasma vapor deposition (PVD) techniques. This method provides a high degree of control over the specific stress profile generated in the stress-engineered support substrate and provides for continuous control over glass formulation and morphology through the thickness dimension of the stress-engineered support substrate. A wafer 2400 (e.g., silicon or other material) is coated with a release layer 2410, most likely a metal. In FIG. 24B, a thick liftoff mask 2420 is then patterned on release layer 2410 such that mask 2420 defines an opening 2422. Note that wafer 2400, release layer 2410, and mask 2420 form a sacrificial structure. Referring to FIGS. 24C and 24D, PVD processing is then used to create the stress engineered layers 2410A-1 and 2410A-2 in opening 2422, placing stresses in the deposited substrate material 2430-1 and 2430-2, for example, by altering the process parameters (e.g., using different temperatures T1 and T2 and/or pressures P1 and P2). Finally, as indicated in FIG. 24E, the mask is then lifted off, and stress-engineered substrate 2410A is singulated (removed) from the remaining sacrificial structure by under-etching the release layer.

Figure 25A:
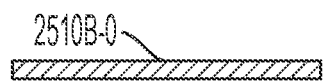
FIGS. 25A to 25E illustrate a second methodology in which a stress-engineered substrate is fabricated in accordance with some embodiments.
Figure 25B:
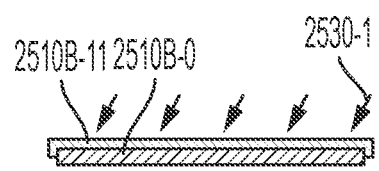
Figure 25C:
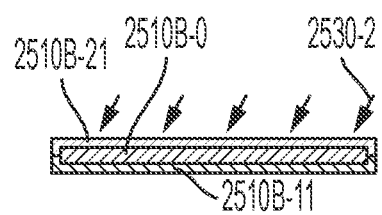
Figure 25D:
Figure 25E:
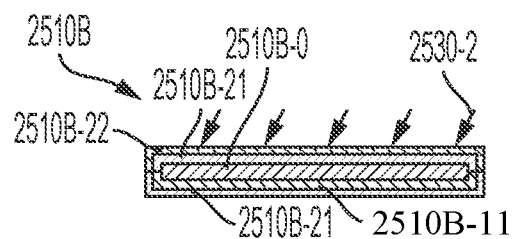

FIGS. 25A to 25E illustrate a second methodology in which a stress-engineered support substrate 2510B is built up by patterned $SiO_2$ on a thin glass core using PVD techniques. This methodology provides a high degree of control over the specific stress profile generated in the stress-engineered support substrate. Referring to FIG. 25A, the process begins using a substantially unstressed glass core substrate 2510B-0 having a thickness T0 in the range of 25 µm and 100 µm. Suitable glass core substrates are currently produced by Schott North America, Inc. of Elmsford, N.Y., USA). Referring to FIGS. 25B to 25E, $SiO_2$ is then deposited on alternating sides of core substrate 2510B-0 via PVD using methods similar to those described above. Specifically, FIG. 25B shows the deposition of material 630-1 in a manner that forms stress-engineered layer 2510B-11 on core substrate 2510B-0. FIG. 25C shows the deposition of material 2530-2 in a manner that forms stress-engineered layer 2510B-21 on an opposite side of core substrate 2510B-0. FIG. 25C shows the subsequent deposition of material 2530-1 in a manner that forms stress-engineered layer 2510B-12 on core layer 2510B-11, and FIG. 25E shows the deposition of material 2530-2 in a manner that forms stress-engineered layer 2510B-22 layer 2510B-21. FIG. 25E shows completed stress-engineered support substrate 2510B including core substrate (central, substantially unstressed layer) 2410B-0 with stress-engineered layers 2510B-11, 2510B-12, 2510B-21 and 2510B-22 formed thereon.

Figure 26A:
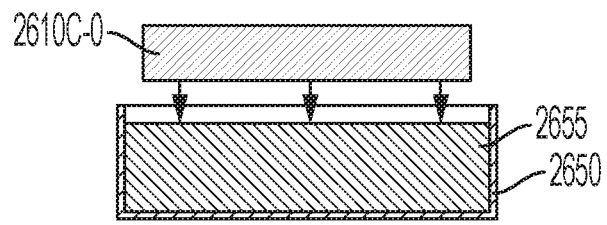
FIGS. 26A to 26E illustrate a third methodology in which a stress-engineered substrate is fabricated in accordance with some embodiments.
Figure 26B:
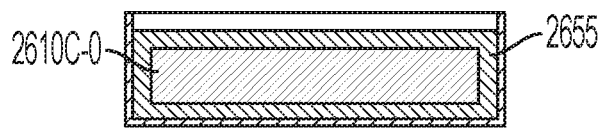
Figure 26C:
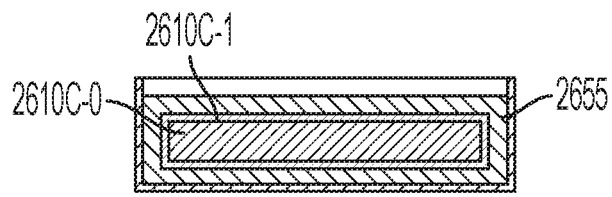
Figure 26D:
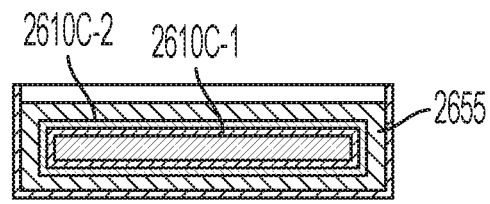
Figure 26E:
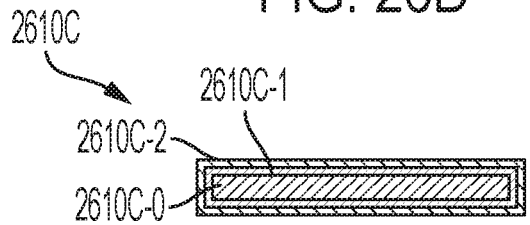

FIGS. 26A to 26E illustrate a third methodology in which a stress-engineered substrate 2610C is produced by subjecting a core substrate to one of an ion-exchange tempering treatment, a chemical treatment and a thermal treatment. Specifically, FIGS. 26A to 26E illustrate an exemplary ion-exchange tempering treatment during which various stress profiles are introduced in a core substrate via molten-salt ion exchange. FIG. 26A shows a core substrate 2610C-0 over a vat 2650 containing a molten-salt solution 2655. FIG. 26B shows core substrate 2610C-0 immediately after sub-mersion in molten-salt solution 2655, FIG. 26C shows core substrate 2610C-0 after a first time period of submersion in molten-salt solution 2655 in which a first stress-engineered layer 2610C-1 is formed, and FIG. 26D shows the structure after a second time period of submersion in molten-salt solution 2655 in which a second stress-engineered layer 2610C-2 is formed on first stress-engineered layer 2610C-1. FIG. 26E shows completed stress-engineered support substrate 2600C including central core substrate 26710C-0 and stress-engineered layers 2610C-1 and 2610C-2.

According to a fourth methodology, a hybrid of the above second and third methods is employed in which diced, thin glass core substrates are ion-exchange tempered, and then multiple layers of SiO2 are deposited on the tempered substrates to further increase the induced stresses.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A device configured to implement a plurality of functions, the device comprising:
    at least one stress-engineered portion, comprising:
        at least one tensile stress layer having a residual tensile stress; and
        at least one compressive stress layer having a residual compressive stress and being mechanically coupled to the at least one tensile stress layer such that the at least one tensile stress layer and the at least one compressive stress layer are self-equilibrating, the stress-engineered portion configured to fracture due to propagating cracks generated in response to energy applied to the stress-engineered portion via a trigger mechanism attached to, and supported by, the stress-engineered portion; and at least one second portion, wherein:
fracture of the stress-engineered portion, while leaving the at least one second portion intact and the device operable, changes functionality of the device from a first function to a second function, different from the first function; and
each of the first and second functions comprises at least one of an electrical function, a mechanical function, and an optical function.

2. The device of claim 1, wherein the trigger mechanism is configured to supply one or more of mechanical energy, thermal energy, electrical energy, chemical energy, magnetic energy, and optical energy.

3. The device of claim 1, wherein the stress-engineered portion is arranged such that fracture of the stress-engineered portion is configured to cause the second portion to contact a third portion of the device.

4. The device of claim 1, wherein the stress-engineered portion is arranged such that fracture of the stress-engineered portion is configured to cause disconnection of the second portion from a third portion of the device.

5. The device of claim 1, wherein the stress-engineered portion is arranged such that fracture of the stress-engineered portion is configured to cause one or both of a change in mass and a change in volume of the device.

6. The device of claim 1, wherein the stress-engineered portion is arranged such that fracture of the stress-engineered portion is configured to cause a change in shape of the device without substantially changing mass or volume of the device.

7. The device of claim 1, wherein the stress-engineered portion is arranged such that fracture of the stress-engineered portion is configured to change a mechanical functionality of the device.

8. The device of claim 1, wherein the stress-engineered portion is arranged such that fracture of the stress-engineered portion is configured to cause at least one of blocking and unblocking of an aperture.

9. The device of claim 1, wherein the stress-engineered portion is arranged such that fracture of the stress-engineered portion is configured to cause at least one of connection and disconnection of first and second containers.

10. The device of claim 1, wherein the stress-engineered portion is arranged such that fracture of the stress-engineered portion is configured to cause a change in position of the first portion.

11. The device of claim 1, wherein the stress-engineered portion is arranged such that fracture of the stress-engineered portion is configured to cause a change in mobility of the first portion.

12. The device of claim 1, wherein the stress-engineered portion is arranged such that fracture of the stress-engineered portion is configured to cause a change in a surface characteristic of the device.

13. The device of claim 1, wherein the stress-engineered portion is arranged such that fracture of the stress-engineered portion is configured to cause a change in at least one of an electrical and a mechanical resonance of the device.

14. The device of claim 1, wherein the stress-engineered portion is arranged such that fracture of the stress-engineered portion is configured to change an electrical functionality of the device.

15. The device of claim 1, wherein the stress-engineered portion is arranged such that fracture of the stress-engineered portion is configured to cause at least one of electrical connection and electrical disconnection of a first electrical component and a second electrical component.

16. The device of claim 15, wherein the electrical connection or electrical disconnection of the first electrical component and the second electrical component changes data stored in the device.

17. The device of claim 1, wherein the stress-engineered portion is arranged such that fracture of the stress-engineered portion is configured to change an optical functionality of the device.

18. The device of claim 1, wherein the stress-engineered portion is arranged such that fracture of the stress-engineered portion is configured to cause a change in at least one of optical transmissivity, optical reflectivity, optical scattering, and optical bandpass of the device.

19. The device of claim 1, wherein the second portion is configured to maintain its shape after the stress-engineered portion fractures.

20. The device of claim 1, wherein mechanical compromise of the second portion triggers fracture of the stress-engineered portion.

21. A method of changing functionality of a device configured to implement a plurality of functions and comprising a stress-engineered portion and at least one second portion, the method comprising:
fracturing the stress-engineered portion of the device via a trigger mechanism attached to, and supported by, the stress-engineered portion while leaving the at least one second portion intact, the stress-engineered portion comprising:
at least one tensile stress layer having a residual tensile stress; and
at least one compressive stress layer having a residual compressive stress and being mechanically coupled to the at least one tensile stress layer such that the at least one tensile stress layer and the at least one compressive stress layer are self-equilibrating, the stress-engineered portion fracturing due to propagating cracks generated in response to energy applied to the stress-engineered portion via the trigger mechanism; and
in response to the fracturing of the stress-engineered portion, while leaving the at least one second portion intact and the device operable, causing a functionality of the device to change from a first function to a second function, different from the first function;
wherein each of the first and second functions comprises at least one of an electrical function, a mechanical function, and an optical function.

* * * * *